(12) United States Patent
Inoue et al.

(10) Patent No.: US 8,135,622 B2
(45) Date of Patent: Mar. 13, 2012

(54) ORDER SUPPORT SYSTEM, DEVICE MONITORING METHOD, AND PROGRAM PRODUCT

(75) Inventors: Yuuki Inoue, Chiba (JP); Keiji Nagai, Kanagawa (JP); Yutaka Nakamura, Kanagawa (JP); Koji Dan, Kanagawa (JP); Masato Takahashi, Kanagawa (JP); Shogo Hyakutake, Kanagawa (JP); Fujio Takahashi, Tokyo (JP); Yoshiaki Murata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1140 days.

(21) Appl. No.: 11/946,482

(22) Filed: Nov. 28, 2007

(65) Prior Publication Data

US 2008/0140646 A1  Jun. 12, 2008

(30) Foreign Application Priority Data

Dec. 7, 2006  (JP) .................................. 2006-330926

(51) Int. Cl.
*G06Q 30/00* (2012.01)
(52) U.S. Cl. ...................... 705/26.1; 705/27.1
(58) Field of Classification Search ......... 705/26.1–27.2
See application file for complete search history.

(56) References Cited

U.S. PATENT DOCUMENTS

| 2003/0074268 A1* | 4/2003 | Haines et al. ................... 705/26 |
| 2003/0229551 A1 | 12/2003 | Kobayashi |
| 2005/0283666 A1* | 12/2005 | Marshall et al. ................. 714/25 |

FOREIGN PATENT DOCUMENTS

| CN | 1452107 A | 10/2003 |
| CN | 1685289 A | 10/2005 |
| JP | 2003-345560 | 12/2003 |

OTHER PUBLICATIONS

Zatti, Stefano; Ashfield, James C.; Baker, James; Miller, Ellis L. IBM Systems Journal; v31n2; pp: 353-380 1992.*

* cited by examiner

*Primary Examiner* — William Allen
*Assistant Examiner* — Resha Desai
(74) *Attorney, Agent, or Firm* — Oblon, Spivak, McClelland, Maier & Neustadt, L.L.P.

(57) ABSTRACT

In a disclosed order support system, devices connected to a communication network are searched for and device information is acquired from each of the found devices. Specified information used for extracting devices to be monitor target candidates is obtained, which is specified according to a predetermined attribute in the device information. Based on the obtained information, devices to be monitor target candidates are extracted from among the found devices. A list of the extracted devices is displayed, and devices to be monitor targets are selected. Status information of a consumable element in each monitor target device is acquired and sent to an order-support apparatus. The order-support apparatus creates an e-mail including a URL of a website used for ordering the consumable element detected as being deficient according to the received status information, and sends the e-mail to an e-mail address associated with the device with the deficient consumable element.

18 Claims, 22 Drawing Sheets

FIG.4

USER REGISTRATION PAGE — 220

CUSTOMER NAME — 221

REQUIRED) POSTAL CODE — 222

REQUIRED) ADDRESS — 223

REQUIRED) COMPANY NAME — 224

DEPARTMENT NAME — 225

REQUIRED) TELEPHONE NUMBER — 226

FAX NUMBER — 227

REQUIRED) E-MAIL ADDRESS — 228

ADDRESS FOR DELIVERY (PLEASE FILL OUT IF DIFFERENT FROM ABOVE)

POSTAL CODE

ADDRESS

COMPANY NAME

DEPARTMENT NAME

} 231

REQUIRED) VENDOR ID — 232

REGISTRATION — 233

FIG.7

| MAC ADDRESS | VENDOR NAME | MODEL NAME | SERIAL NUMBER | MONITOR FLAG | REMARKS | ... | STATUS | | | | | MAIL FLAG |
| --- | --- | --- | --- | --- | --- | --- | --- | --- | --- | --- | --- | --- |
| | | | | | | | C | M | Y | K | Any ... | |
| 00.00.74.71.42.0a | A | A7200 | 123456 | Yes | | | N | N | N | N | N ... | No |
| 00.30.c1.00.04.43 | B | B LaserJet 8500 | 00.30.c1.00.04.43 | Yes | | | N | N | N | N | N ... | No |
| 00.04.00.f0.0c.0e | C | CL2455 | 00.04.00.f0.0c.0e | Yes | | | N | N | N | N | N ... | No |
| 00.10.83.a3.d4.1c | B | B LaserJet4050 | 00.10.83.a3.d4.1c | Yes | | | N | N | N | N | N ... | No |
| 00.10.83.bb.57.0e | B | B LaserJet4050 | 00.10.83.bb.57.0e | Yes | | | N | N | N | N | N ... | No |
| 00.30.c1.0c.f4.c7 | B | B LaserJet4050 | 00.30.c1.0c.f4.c7 | Yes | | | N | N | N | N | N ... | No |
| 00.00.74.71.42.1b | A | A3228C | P6020101199 | Yes | | | N | N | N | N | N ... | No |
| ... | ... | | | | | | ... | ... | ... | ... | ... | ... |

SEARCH RESULT DEVICE LIST                                  240
                                                    241        242
| # | SERIAL NUMBER | MAC ADDRESS | IP ADDRESS | MODEL NAME | VENDOR NAME | REMARKS | MONITOR OBJECT |
|---|---|---|---|---|---|---|---|
| 1 | 123456 | 00.00.74.71.42.0a | xxxxxxxxxx | A7200 | A | | ☐ |
| 2 | 00.30.c1.00.04.43 | 00.30.c1.00.04.43 | xxxxxxxxxx | B LaserJet 8500 | B | | ☐ |
| 3 | 00.04.00.f0.0c.0e | 00.04.00.f0.0c.0e | xxxxxxxxxx | CL2455 | C | | ☐ |
| 4 | 00.10.83.a3.d4.1c | 00.10.83.a3.d4.1c | xxxxxxxxxx | B LaserJet 4050 | B | | ☐ |
| 5 | 00.10.83.bb.57.0e | 00.10.83.bb.57.0e | xxxxxxxxxx | B LaserJet 4050 | B | | ☐ |
| 6 | 00.30.c1.0c.f4.c7 | 00.30.c1.0c.f4.c7 | xxxxxxxxxx | A3228C | A | | ☐ |
| 7 | P6020101199 | 00.00.74.71.42.1b | xxxxxxxxxx | | | | |

[SEND] 243

FIG.9

| MAC ADDRESS | VENDOR NAME | MODEL NAME | SERIAL NUMBER | MONITOR FLAG | REMARKS | ... | STATUS | | | | | MAIL FLAG |
|---|---|---|---|---|---|---|---|---|---|---|---|---|
| | | | | | | | C | M | Y | K | Any | |
| 00.00.74.71.42.0a | A | A7200 | 123456 | Yes | OMORI 4F | | N | N | N | N | N | ... | No |
| 00.30.c1.00.04.43 | B | B LaserJet 8500 | 00.30.c1.00.04.43 | Yes | | | N | N | N | N | N | ... | No |
| 00.04.00.f0.0c.0e | C | CL2455 | 00.04.00.f0.0c.0e | Yes | | | N | N | N | N | N | ... | No |
| 00.10.83.a3.d4.1c | B | B LaserJet4050 | 00.10.83.a3.d4.1c | No | | | N | N | N | N | N | ... | No |
| 00.10.83.bb.57.0e | B | B LaserJet4050 | 00.10.83.bb.57.0e | No | | | N | N | N | N | N | ... | No |
| 00.30.c1.0c.f4.c7 | B | B LaserJet4050 | 00.30.c1.0c.f4.c7 | No | | | N | N | N | N | N | ... | No |
| 00.00.74.71.42.1b | A | A3228C | P6020101199 | | | | N | N | N | N | N | ... | |
| ... | ... | ... | ... | ... | ... | | ... | ... | ... | ... | ... | ... | ... |

| MAC ADDRESS | VENDOR NAME | MODEL NAME | SERIAL NUMBER | MONITOR FLAG | REMARKS | ... | STATUS | | | | | | MAIL FLAG |
|---|---|---|---|---|---|---|---|---|---|---|---|---|---|
| | | | | | | | C | M | Y | K | Any | ... | |
| 00.00.74.71.42.0a | A | A7200 | 123456 | Yes | OMORI F4 | | N | N | N | N | N | ... | No |
| 00.30.c1.00.04.43 | B | B LaserJet 8500 | 00.30.c1.00.04.43 | Yes | | | N | N | N | N | N | ... | No |
| 00.04.00.f0.0c.0e | C | CL2455 | 00.04.00.f0.0c.0e | Yes | | | N | N | N | N | N | ... | No |
| 00.10.83.a3.d4.1c | B | B LaserJet4050 | 00.10.83.a3.d4.1c | Yes | | | N | N | N | N | N | ... | No |
| 00.10.83.bb.57.0e | B | B LaserJet5000 | 00.10.83.bb.57.0e | Yes | | | N | N | N | N | N | ... | No |
| 00.30.c1.0c.f4.c7 | B | B LaserJet4050 | 00.30.c1.0c.f4.c7 | No | | | N | N | N | N | N | ... | No |
| 00.00.74.71.42.1b | A | A3228C | P6020101199 | No | | | N | N | N | N | N | ... | No |
| .. | .. | .. | .. | .. | .. | .. | .. | .. | .. | .. | .. | .. | .. |

| MAC ADDRESS | VENDOR NAME | MODEL NAME | SERIAL NUMBER | REMARKS | MONITOR STATUS | SUPPLY STATUS | REPORT FLAG |
|---|---|---|---|---|---|---|---|
| 00.00.74.71.42.0a | A | A7200 | 123456 | OMORI F4 | OK | normal | REPORTED |
| 00.30.c.1.00.04.43 | B | B LaserJet 8500 | 00.30.c.1.00.04.43 | | OK | normal | REPORTED |
| 00.04.00.f0.0c.0e | C | CL2455 | 00.04.00.f0.0c.0e | | OK | end | NOT REPORTED |
| 00.10.83.a3.d4.1c | B | B LaserJet4050 | 00.10.83.a3.d4.1c | | OK | near end | REPORTED |
| 00.10.83.bb.57.0e | B | B LaserJet5000 | 00.10.83.bb.57.0e | | OK | near end | REPORTED |

| MAC ADDRESS | VENDOR NAME | MODEL NAME | SERIAL NUMBER | REMARKS | MONITOR STATUS | SUPPLY STATUS | REPORT FLAG |
|---|---|---|---|---|---|---|---|
| 00.00.74.71.42.0a | A | A7200 | 123456 | OMORI F4 | OK | near end | NOT REPORTED |
| 00.30.c.1.00.04.43 | B | B LaserJet 8500 | 00.30.c.1.00.04.43 | | NG | normal | REPORTED |
| 00.04.00.f0.0c.0e | C | CL2455 | 00.04.00.f0.0c.0e | | OK | end | NOT REPORTED |
| 00.10.83.a3.d4.1c | B | B LaserJet4050 | 00.10.83.a3.d4.1c | | OK | end | NOT REPORTED |
| 00.10.83.bb.57.0e | B | B LaserJet5000 | 00.10.83.bb.57.0e | | OK | near end | REPORTED |

| REPORT INFORMATION | REMARKS | SUPPLEMENT |
|---|---|---|
| [ Header ] | 【Header information】 | |
| Date&Time | Date and time | |
| User ID | User ID for sending to server | Information for identifying user |
| Password | Password for sending to server | |
| | | |
| [ Device Info ] | 【Device information】 | |
| Vendor name | Vendor name of device | |
| Model name | Model name of device | |
| Serial Number | Serial number | |
| Mac Address | MAC address | |
| IP Address | IP address | |
| Toner ID | Toner ID | |
| Toner Name | Toner name | |
| Toner Status | Toner status | |
| Toner Level | Toner level | |
| Toner Name Localized | Toner name (character string) | |
| Toner Name Localized Code | Toner name (code) | |
| Total Counter | Total counter value | |
| Monochrome Counter | Monochrome counter value | (*1) |
| Color Counter | Color counter value | (*1) |
| Cyan Counter | Cyan counter value | (*1) |
| Magenta Counter | Magenta counter value | (*1) |
| Yellow Counter | Yellow counter value | (*1) |
| Black Counter | Black counter value | (*1) |
| Red Counter | Red counter value | (*1) |

Address: ⟨E-mail address of user pertaining to shortage report information⟩
Title: ⟨Title indicating shortage report e-mail⟩
Body: ⟨Information of device
(vendor name, model name, remarks)⟩
⟨Information indicating status of lacking supply, information on supply⟩
⟨URL of order page⟩
(e.g.: http://www.rrrsupply.com)

FIG.17

| MAC ADDRESS | VENDOR NAME | MODEL NAME | SERIAL NUMBER | REMARKS | MONITOR STATUS | SUPPLY STATUS | REPORT FLAG |
|---|---|---|---|---|---|---|---|
| 00.00.74.71.42.0a | A | A7200 | 123456 | OMORI F4 | OK | near end | REPORTED |
| 00.30.c.1.00.04.43 | B | B LaserJet 8500 | 00.30.c.1.00.04.43 | | NG | normal | REPORTED |
| 00.04.00.f0.0c.0e | C | CL2455 | 00.04.00.f0.0c.0e | | OK | end | REPORTED |
| 00.10.83.a3.d4.1c | B | B LaserJet4050 | 00.10.83.a3.d4.1c | | OK | end | REPORTED |
| 00.10.83.bb.57.0e | B | B LaserJet5000 | 00.10.83.bb.57.0e | | OK | near end | REPORTED |

Order Page

A consumable element is lacking in the following device.

| Manufacturer name | Model name | Serial No. | Remarks |
|---|---|---|---|
| A | A 7200 | 123456 | 6F South side |

⎫
⎬ 261
⎭

Lacking consumable element ⎫
⎬ 261A
A IP toner (Yellow) ⎭

Please specify the necessary quantity of consumable elements.
※ A brief description of the product will appear by clicking the product name.

262

| Product name | Product code | Unit price exclusive of tax | Quantity | Total |
|---|---|---|---|---|
| A IP toner (Cyan) | 636341 | ¥27,000 | 0 | ¥0 |
| A IP toner (Magenta) | 636340 | ¥27,000 | 0 | ¥0 |
| A IP toner (Yellow) | 636339 | ¥27,000 | 1 ~2621 | ¥28,350 |
| A IP toner (Black) | 636338 | ¥32,000 | 0 | ¥0 |
| A Developing unit color type 7200 | 509626 | ¥22,500 | 0 | ¥0 |
| A Fixing oil unit type 7200 | 509259 | ¥6,000 | 0 | ¥0 |
| | | | Total | ¥28,350 |

Order ~2622

Purchase history of consumables elements
for AA 7200 (S/N:123456)
2005/12/10  A IP toner (Cyan)      1 pc.         Ordered
2005/11/21  A IP toner (Magenta)   1 pc.  ⎬263  Delivered
2005/09/30  A IP toner (Black)     1 pc.         Delivered

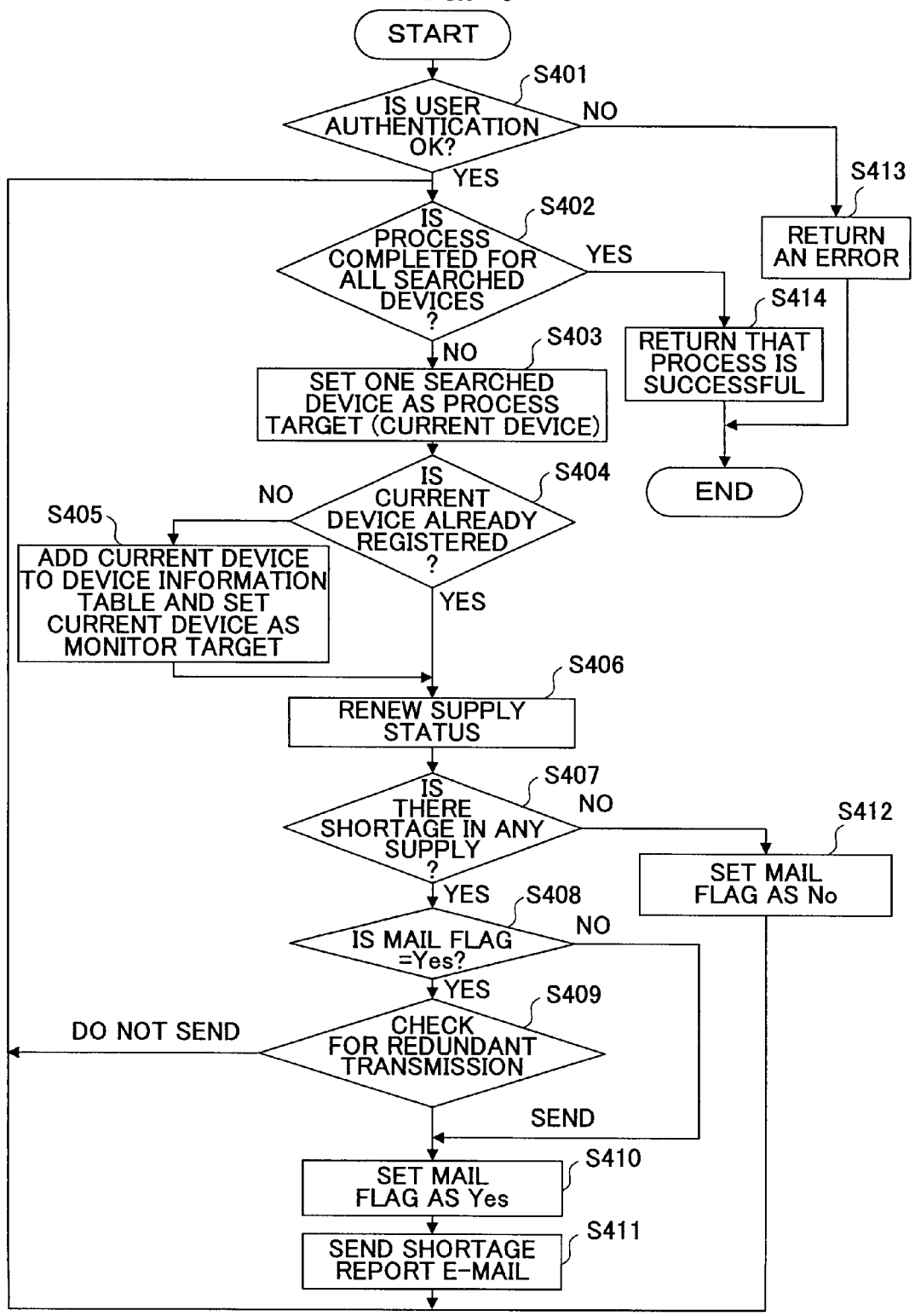

FIG.22

| MONITOR PAGE | | | | |
|---|---|---|---|---|
| Printer  Center Server  Options  View  Help | | | | |
| VENDOR | MODEL NAME | SERIAL NUMBER | STATUS | REMARKS |
| A | A7200 | 123456 | Yellow Toner near end | OMORI 4F |
| B | B LaserJet8500 | 00.30.c.1.00.04.43 | | |
| C | CL2455 | 00.04.00.f0.00.0e | Toner end | |
| B | B LaserJet4050 | 00.10.83.a3.d4.1c | Toner end | |
| B | B LaserJet5000 | 00.10.83.bb.57.0e | Toner near end | |

230

231

ORDER SUPPORT SYSTEM, DEVICE MONITORING METHOD, AND PROGRAM PRODUCT

BACKGROUND OF THE INVENTION

1. Field of the Invention

The present invention relates generally to order support systems, device monitoring methods, and program products, and more particularly to an order support system, a device monitoring method, and a program product for supporting the operation of ordering consumable elements of devices.

2. Description of the Related Art

In company offices, plural devices such as printers, copiers, fax machines, or multifunction peripherals realizing functions of such devices in a single housing are interconnected via a communication network.

Each of these devices includes consumable elements that are consumed by using the device. The function of the device can be maintained by appropriately replacing such a consumable element. For example, in the case of a printer, toner, a fixing unit, a toner eject bottle, a photoconductor, and a developer correspond to consumable elements, which are generally referred to as supplies.

It is difficult to determine the extent to which a supply is consumed from the outside of a device. Conventionally, a user acknowledges that there is no toner remaining by, for example, receiving an error message after sending an instruction to perform a printing operation. The user replaces a toner cartridge upon receiving the error message.

Patent Document 1: Japanese Laid-Open Patent Application No. 2003-345560

However, in order to replace a supply, it is necessary to purchase the supply. Generally, supplies are purchased at a mass merchandise outlet or via mail-order; however, there are many devices in an office, and the supplies to be purchased have different model numbers according to the respective devices. Hence, a user needs to confirm the correct model number for each supply to be purchased according to the device, before purchasing the supplies or carrying out ordering procedures. Thus, extremely time-consuming efforts are required of the user.

SUMMARY OF THE INVENTION

The present invention provides an order support system, a device monitoring method, and a program product in which one or more of the above-described disadvantages are eliminated.

A preferred embodiment of the present invention provides an order support system, a device monitoring method, and a program product capable of facilitating the procedures for replacing supplies of devices.

An embodiment of the present invention provides an order support system including a device information acquiring unit configured to search for one or more devices connected to a communication network and acquire device information from each of the devices found as a result of the search; a setting unit configured to obtain specified information used for extracting one or more devices to be candidates for monitor targets, wherein the information is specified according to a predetermined attribute included in the device information; an extracting unit configured to extract, based on the information obtained by the setting unit, one or more devices to be the candidates for the monitor targets from among the devices found as a result of the search; a monitor target selecting unit configured to display a list of the devices extracted by the extracting unit, from which one or more devices are to be selected as the monitor targets; a device monitoring apparatus configured to acquire status information of at least one consumable element in each of the devices selected as the monitor targets, wherein the device monitoring apparatus includes a status information sending unit configured to send the status information to an order-support apparatus; and the order-support apparatus configured to create an e-mail including a URL indicating a website used for ordering at least one consumable element that is detected as being deficient according to the status information received from the device monitoring apparatus, and to send the e-mail to an e-mail address registered in advance in association with the device corresponding to the deficient consumable element.

An embodiment of the present invention provides a device monitoring method to be executed by a computer, the device monitoring method including a device information acquiring step of searching for one or more devices connected to a communication network and acquiring device information from each of the devices found as a result of the search; a setting step of obtaining specified information used for extracting one or more devices to be candidates for monitor targets, wherein the information is specified according to a predetermined attribute included in the device information; an extracting step of extracting, based on the information obtained at the setting step, one or more devices to be the candidates for the monitor targets from among the devices found as a result of the search; a monitor target selecting step of displaying a list of the devices extracted at the extracting step, from which one or more devices are to be selected as the monitor targets; and a status information sending step of acquiring status information of at least one consumable element in each of the devices selected as the monitor targets, and sending the status information to an order-support apparatus, wherein the order-support apparatus is configured to create an e-mail including a URL indicating a website used for ordering at least one consumable element that is detected as being deficient according to the received status information, and is also configured to send the e-mail to an e-mail address registered in advance in association with the device corresponding to the deficient consumable element.

An embodiment of the present invention provides a device monitoring program product including instructions for causing a computer to perform a device information acquiring step of searching for one or more devices connected to a communication network and acquiring device information from each of the devices found as a result of the search; a setting step of obtaining specified information used for extracting one or more devices to be candidates for monitor targets, wherein the information is specified according to a predetermined attribute included in the device information; an extracting step of extracting, based on the information obtained at the setting step, one or more devices to be the candidates for the monitor targets from among the devices found as a result of the search; a monitor target selecting step of displaying a list of the devices extracted at the extracting step, from which one or more devices are to be selected as the monitor targets; and a status information sending step of acquiring status information of at least one consumable element in each of the devices selected as the monitor targets, and sending the status information to an order-support apparatus, wherein the order-support apparatus is configured to create an e-mail including a URL indicating a website used for ordering at least one consumable element that is detected as being deficient according to the received status information, and is also configured to send the e-mail to an e-mail address registered in advance in association with the device corresponding to the deficient consumable element.

According to one embodiment of the present invention, an order support system, a device monitoring method, and a program product are provided, which are capable of facilitating the procedures for replacing supplies of devices.

BRIEF DESCRIPTION OF THE DRAWINGS

Other objects, features and advantages of the present invention will become more apparent from the following detailed description when read in conjunction with the accompanying drawings, in which:

FIG. 4 is an example of a user registration page;

FIG. 7 is an example of a device information table corresponding to the device database;

FIG. 8 is an example of a displayed search result device list page;

FIG. 9 is an example of a device information table including selections as to whether the devices are to be monitored and remarks;

FIG. 11 illustrates an example of the renewed device information table in a case where the model name in an entry of a device information table does not coincide with that of a current device (a process target);

FIG. 13 illustrates an example of a cache table;

FIG. 14 illustrates an example of the cache table renewed based on polling results of device information;

FIG. 15 is an example of the structure of status change report information;

FIG. 17 illustrates an example of the renewed cache table when the status change report information has been properly received;

FIG. 18 is an example of an order page;

FIG. 19 is a flowchart of a process performed by the order support program according to the status change report information;

FIG. 22 is an example of a monitor page.

DETAILED DESCRIPTION OF THE PREFERRED EMBODIMENTS

A description is given, with reference to the accompanying drawings, of an embodiment of the present invention.

Figure 1:
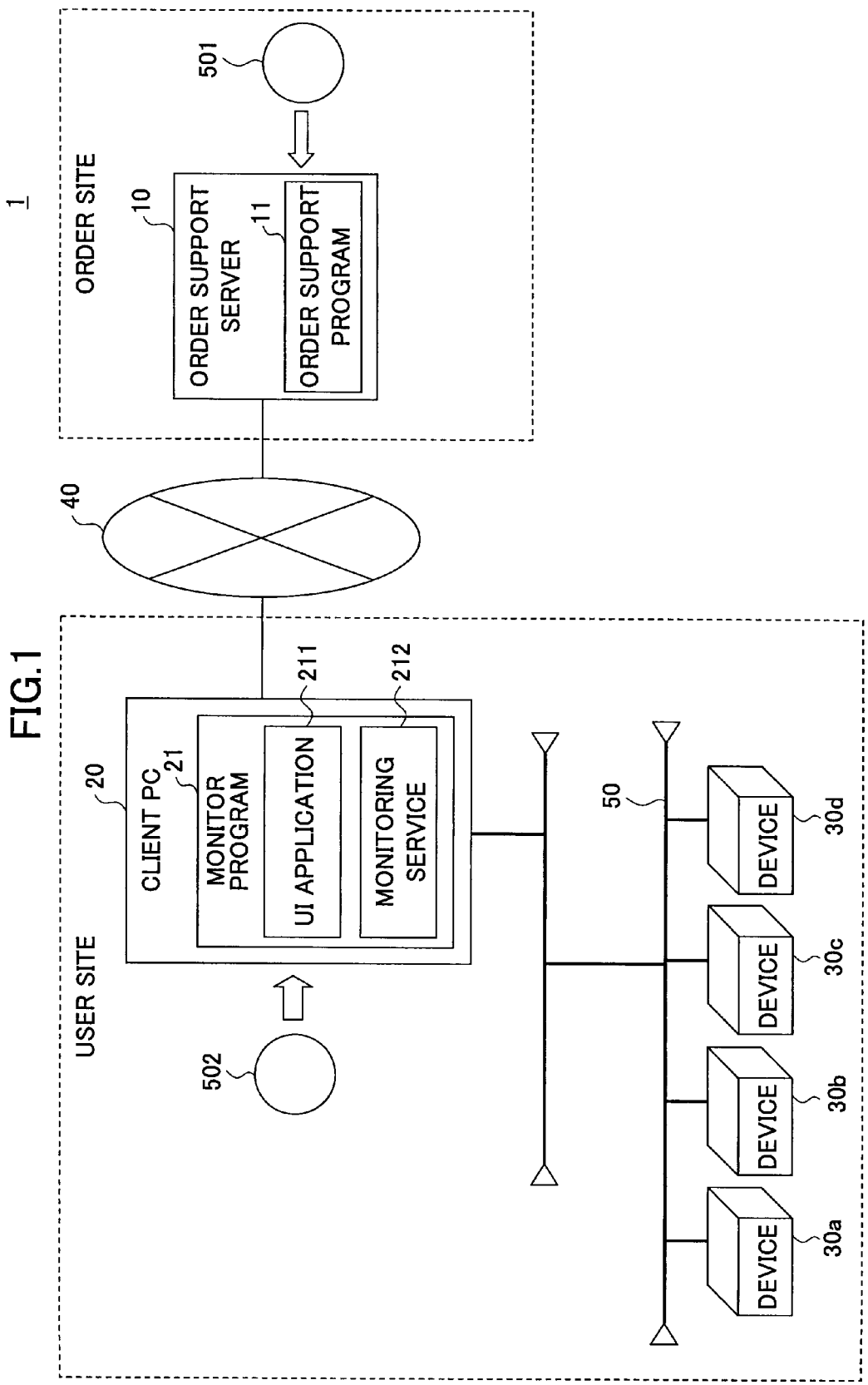
FIG. 1 is a schematic diagram of an order support system according to an embodiment of the present invention.

FIG. 1 is a schematic diagram of an order support system according to an embodiment of the present invention. As shown in FIG. 1, an order support system 1 includes an order support server 10, a client PC 20, and devices 30a, 30b, 30c, and 30d (hereinafter also collectively referred to as "device 30"). The order support server 10 is installed at an order site (the vendor of consumable elements of the device 30, for example, the manufacturer of the device 30). The client PC 20 and the device 30 are installed at a user site (at the user of the device 30, for example, at an office). The order support server 10 and the client PC 20 are connected to each other via a wide area network 40 such as the Internet. The client PC 20 and the device 30 are connected to each other via a network 50 (either wired or wireless) such as a LAN (Local Area Network) provided at the user site.

The device 30 is an image forming apparatus such as a typical printer or a multifunction peripheral that forms images by consuming toner or ink. In the present embodiment, the device 30 supports the MIB (Management Information Base). The device 30 can respond to a request for MIB information, which request is received via the network 40 based on the SNMP (Simple Network Management Protocol). Furthermore, in the present embodiment, the device 30 can detect information indicating the status of consumable elements (status information). The status information can be qualitative (normal/near-end/end) or quantitative (100%, 90%, ..., 10%, 0%).

The client PC 20 is a general-purpose computer, and a monitor program 21 is installed therein. The monitor program 21 can be installed from a recording medium 502 such as a CD-ROM or downloaded via the network 40. As described below, in the present embodiment, the monitor program 21 is downloaded via the network 40.

In FIG. 1, the monitor program 21 includes a UI application 211 and a monitoring service 212. The UI application 211 is started up as a separate process from the monitoring service 212, and provides a GUI (Graphical User Interface) corresponding to functions of the monitoring service 212. The UI application 211 displays a page for specifying setting information of the monitoring service 212 and a page for displaying device information acquired by the monitoring service 212.

Figure 2:
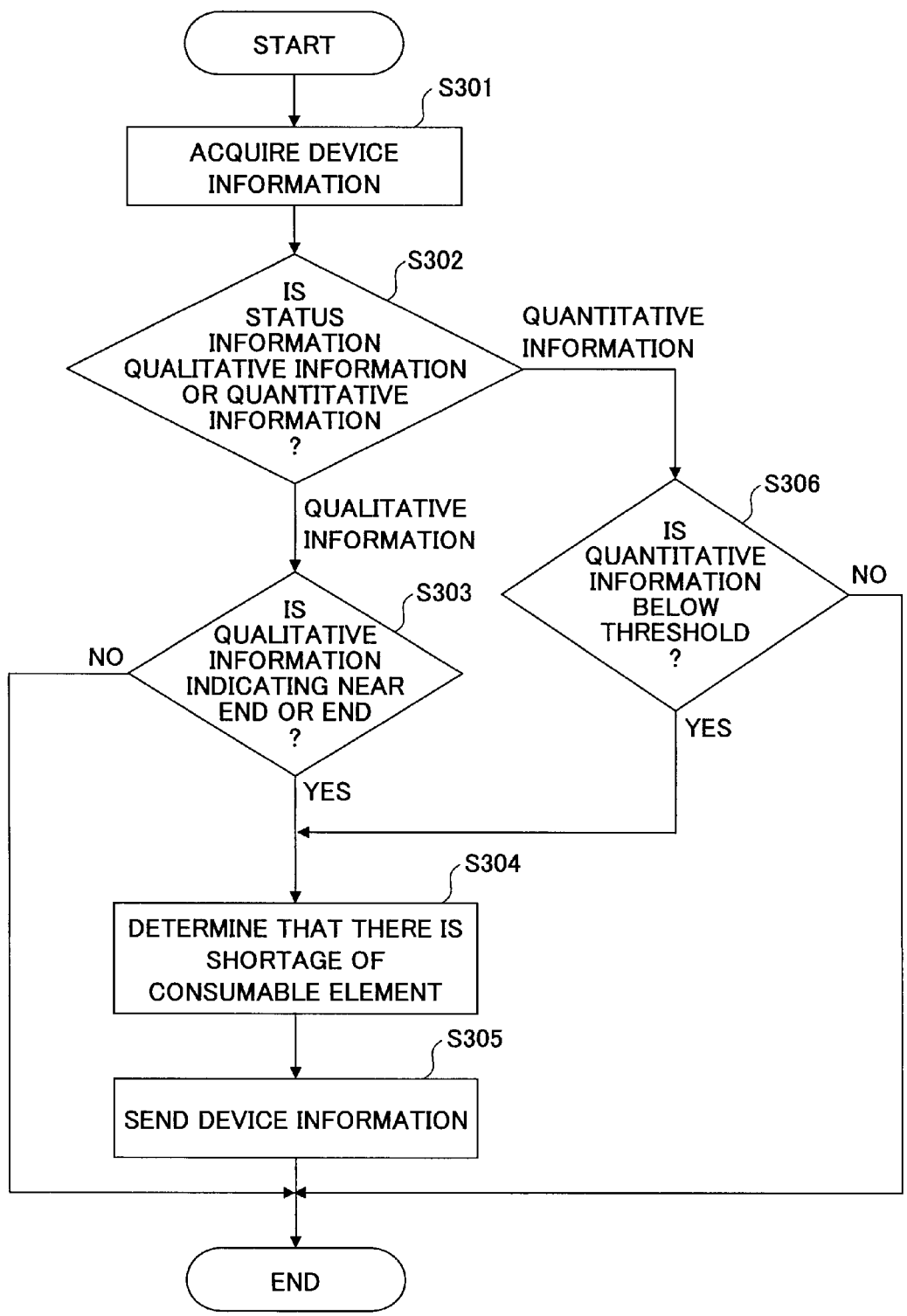
FIG. 2 is a flowchart of a process that a monitoring service causes a client PC to perform.

The monitoring service 212 is a program that is started up as a daemon process, which is loaded into a memory in the client PC 20 and processed by a CPU to cause the client PC 20 to execute the following functions. FIG. 2 is a flowchart of a process that the monitoring service 212 causes the client PC 20 to perform.

The client PC 20 periodically acquires device information (MIB information) from each device 30 based on the monitor program 21 (step S301). The device information includes information (status information) for determining the status of consumable elements used by the device 30, such as the toner status or a total counter value (total number of printed out sheets). The device information can include the status information of other consumable elements, such as a fixing unit, a toner eject bottle, a photoconductor, or a developer. If the status information of consumable elements included in the acquired device information is qualitative (i.e., normal/near-end/end) ("qualitative information" in step S302), and the information indicates near-end or end (hereinafter collectively referred to as "end") (Yes in step S303), it is determined that there is a shortage (lack) in the consumable element (step S304), and the device information of the device 30 is sent to the order support server 10 (step S305). On the other hand, if the status information of consumable elements included in the acquired device information is quantitative (i.e., 100%, 90%, ..., 10%, 0%) ("quantitative information" in step S302), it is determined whether the information indicates a value below a predetermined threshold (less than or equal to 30%) (step S306). If the value is below the predetermined threshold (Yes in step S306), it is determined that there is a shortage (lack) in the consumable element (step S304), and the device information of the device 30 is sent to the order support server 10 (step S305).

In the present embodiment, the client PC 20 detects whether there is a shortage (lack) in the consumable element; however, this detection can be performed by the order support server 10. In the latter case, the client PC 20 needs to send the device information of all of the devices 30 to the order support server 10. Thus, in terms of reducing the network load, it is preferable to send, to the order support server 10, the device information of only the device 30 that is detected by the client PC 20 as lacking in a consumable element.

In the client PC 20, a mailer for sending/receiving e-mails and a Web browser for browsing a Web page are also installed.

The order support server 10 is a general-purpose computer that has a function of a Web server and has an order support program 11 installed therein. The order support program 11 can be installed from a recording medium 501 such as a CD-ROM or downloaded via the network 40.

The order support program 11 is loaded in a memory of the order support server 10 and processed by a CPU to cause the order support server 10 to execute the following functions. That is, based on the order support program 11, an e-mail creating unit of the order support server 10 creates an e-mail to prompt replenishment (or replacement) of a consumable element (hereinafter, "supply") determined as lacking based on the device information received from the client PC 20. The e-mail is sent to an e-mail address of a user that is registered beforehand. The e-mail message contains the URL of a Web page (hereinafter, "supply order page") for ordering the lacking supply. In response to an HTTP request that is transmitted as the user clicks the URL, the order support server 10 returns the supply order page. Then, the order support server 10 receives an order request for the supply, which request is made with the supply order page. In response to the supply order request, the order support server 10 sends an order instruction for the supply to a not shown supply order management system.

The inventors of the present invention are considering construction of a new business model using the order support system 1. First, a description is given of the background of constructing such a business model.

Generally, image forming apparatuses are sold through various distribution channels such as distributors and retailers. A dealer who purchases the products (image forming apparatuses) from the manufacturer and directly sells the products to clients is referred to as a "vendor". Vendors include those who simply sell the image forming apparatus as hardware, and also those who provide solutions in accordance with the client as added value, and perform SI operations for causing the image forming apparatus to function for the solution. These vendors earn revenues from profits gained by selling image forming apparatuses as hardware and from profits gained by providing software based on SI operations.

Even after an image forming apparatus has been sold, the vendor can continuously gain profits by continuously selling supplies. Profits gained by selling supplies are generally higher than those gained by selling the image forming apparatus. However, in conventional cases, after purchasing the apparatus, the client (user) typically purchases supplies from a mass merchandise outlet or via mail-order, without purchasing them through the vendor. Accordingly, the vendor who has sold the image forming apparatus cannot gain continuous profits by selling supplies of the image forming apparatus.

For example, it is assumed that a certain vendor sells image forming apparatuses made by a manufacturer A and a manufacturer B. If the vendor can gain profits by selling supplies of image forming apparatuses in the case of selling image forming apparatuses of the manufacturer A, it will be an incentive for the vendor to sell more image forming apparatuses of the manufacturer A then those of the manufacturer B. As a result, sales of products of the manufacturer A are expected to increase, and therefore the manufacturer A can gain a competitive advantage over the manufacturer B.

The inventors of the present invention have devised a system with which the vendor can gain profits by selling supplies. The present embodiment describes an example where the order support system 1 is applied to such a business model.

Figure 3:
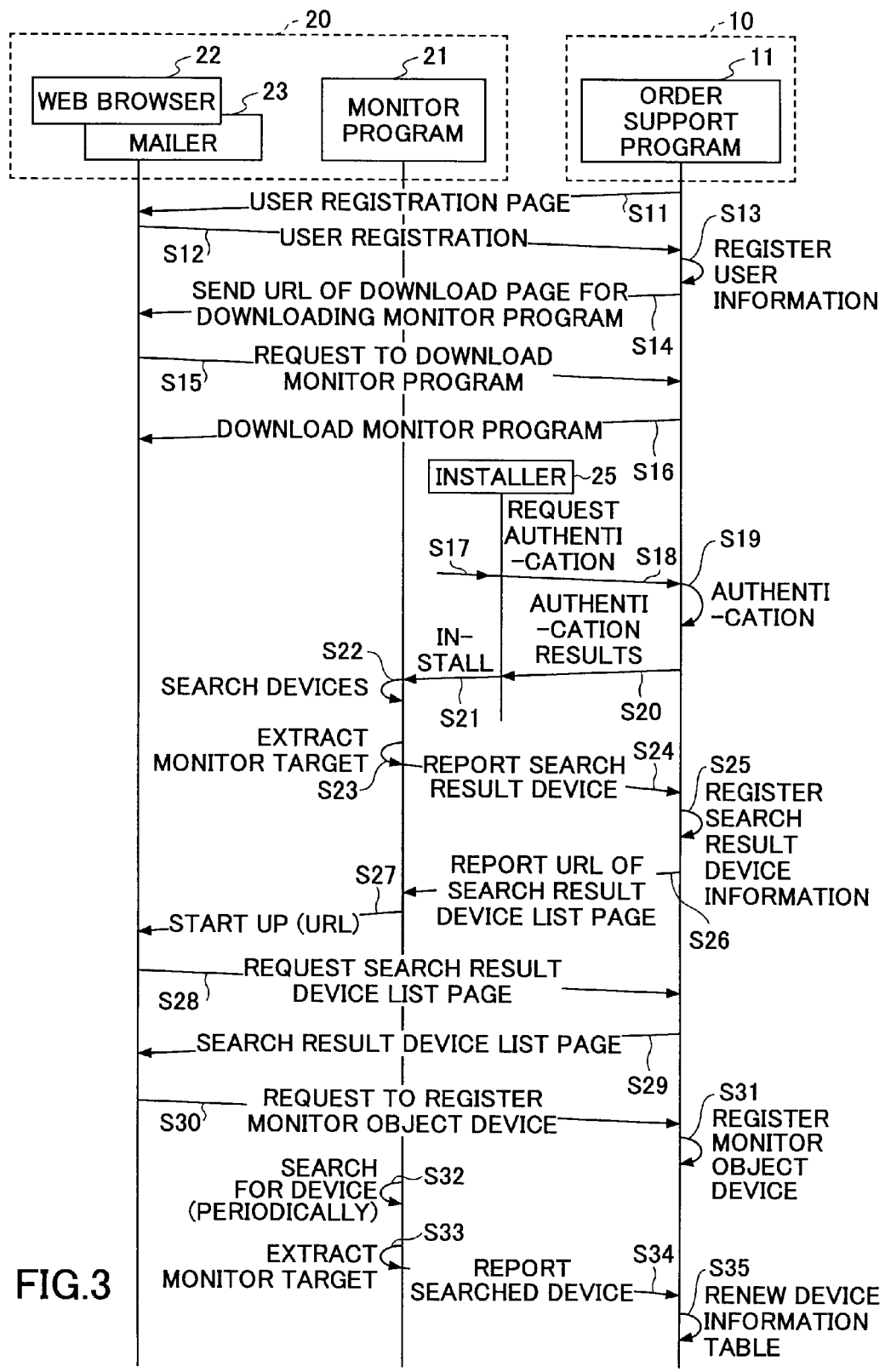
FIG. 3 is a sequence diagram for describing a process of user registration performed by the order support system.

A process performed by the order support system 1 shown in FIG. 1 is described below. A user that purchased the device 30 from a vendor concludes a registration contract for being registered in the order support system 1 with the vendor. The user that has concluded the registration contract first performs user registration as illustrated in FIG. 3. As will become apparent in the description below, the user can expect to reduce costs required for the operation of replenishing (replacing) the supply by using the order support system 1. Such an expectation becomes an incentive for the user to conclude the registration contract.

FIG. 3 is a sequence diagram for describing the process of user registration performed by the order support system 1. As shown in FIG. 3, a Web browser 22 is a general-purpose Web browser installed in the client PC 20. A mailer 23 is a general-purpose mailer installed in the client PC 20.

The user obtains an ID (hereinafter, "access ID") for accessing the order support server 10 to conclude the registration contract and the URL of the order support server 10 from a vendor, and inputs the URL in the Web browser 22. As the URL is input, a request to input the access ID is displayed. If a legitimate access ID is input, a Web page (hereinafter, "user registration page") for performing user registration is sent from the order support server 10 to the Web browser 22 (step S11). Upon receiving the user registration page, the Web browser 22 displays the user registration page.

FIG. 4 is an example of the user registration page. In the following description for FIG. 4, numbers inside ( ) correspond to reference numerals in FIG. 4. As shown in FIG. 4, in a user registration page 220, it is possible to input basic information such as the name of the user (221), a postal code (222), an address (223), a company name (224), a department name (225), a telephone number (226), a fax number (227), and an e-mail address (228), and other information such as a postal code, an address, a company name, and a department name of the address (231) for delivering supplies when orders for supplies are made, and a vendor ID (232). The vendor ID is the ID of the vendor with which the user concludes a registration contract, and is notified by the vendor when the registration contract is concluded.

The user inputs necessary information in the user registration page 220 and clicks a registration button 233. Then, the Web browser 22 sends an HTTP request to the order support server 10, requesting to perform user registration (step S12). The HTTP request includes information input to the user registration page 220 (hereinafter referred to "user information", including the vendor ID).

When the HTTP request is received, the order support program 11 of the order support server 10 registers the user information included in the HTTP request to a predetermined database (hereinafter, "user database") (step S13). When registering the user information, the order support program 11 determines whether the order support server 10 includes an entry of the vendor ID included in the user information. If there is such an entry, the order support program 11 generates or acquires a number for a user ID and a password for the user. The user ID and the password are also included in the user information and registered in the user database.

Subsequently, the order support program 11 sends a URL of a Web page (hereinafter, "download page") for downloading the monitor program 21 and an e-mail (hereinafter, "install information report e-mail") containing the generated user ID and password in the body thereof, to the e-mail address of the user (step S14). The order support program 11 also sends, to the Web browser 22, a Web page for displaying a message reporting that the install information report e-mail has been sent, by including the Web page in an HTTP response made to the HTTP request received in step S12. The user can acknowledge receipt of the install information report e-mail by viewing the Web page. By viewing the install information report e-mail with the mailer 23, the user can confirm the URL of the download page and the user ID and password given to the user.

The URL of the download page does not necessarily have to be reported with an e-mail. For example, in step S14, it is possible to return the download page per se, instead of returning the Web page displaying the message that the install information report e-mail has been sent. However, if the download page is returned at the timing of step S14, the user has to continue the install operation. The method of using the install information report e-mail is more convenient for the user in that the user can perform the install operation whenever convenient, once the mail is received. The information can also be sent by fax or post.

When the user clicks the URL of the download page written in the install information report e-mail, the mailer 23 causes the Web browser 22 to start by taking the URL as an argument. When the Web browser 22 starts, the Web browser 22 displays the download page based on the URL. On the download page, the user clicks a URL of a download destination. Then, the Web browser 22 sends a download request for downloading the monitor program 21 to the order support server 10 (step S15). In response to the download request, the order support program 11 transfers an install package of the monitor program 21, which package is saved in the order support server 10, to the client PC 20 (step S16).

The user starts an installer 25 included in the downloaded install package (step S17). When the installer 25 starts, it displays a request to prompt the user to input the user ID and password reported in the install information report e-mail. When the user inputs the user ID and password, the installer 25 sends the input user ID and password to the order support server 10, and requests user authentication (step S18). The input user ID and password are also saved and managed in the client PC 20.

The order support program 11 cross-checks the user ID and password received from the installer 25 with the user ID and password registered in the user database to authenticate the user (step S19). The order support program 11 returns the authentication results to the monitor program 21 (step S20). When the user is successfully authenticated, the installer 25 installs the monitor program 21 (step S21); when the user is not successfully authenticated, the installer 25 does not install the monitor program 21.

The monitor program 21 is installed only when the user is authenticated. Accordingly, it is possible to prevent a user that has fraudulently obtained the install package from installing the monitor program 21. The monitor program 21 performs communications with the order support program 11 via the network 40. Thus, in order to prevent fraudulent users from using the monitor program 21 and protect the order support server 10 from being attacked via the network 40, it is effective to perform user authentication before installing the monitor program 21.

If the monitor program 21 is properly installed, the monitoring service 212 of the monitor program 21 starts operating in the client PC 20. First, the monitoring service 212 searches for the devices 30 connected to the network 50, and acquires device information about each device from the devices 30 (e.g., a serial number of the device, a MAC address, a model name, a vendor name (name of manufacturer of device); hereinafter, "search result device information") (step S22). The operations of searching for the devices 30 and acquiring the search result device information via the network 50 can be performed by known techniques, such as acquiring MIB (Management Information Base) information according to a SNMP (Simple Network Management Protocol).

Next, the monitor program 21 causes the user to specify information for narrowing down the devices 30 to extract candidate devices to be monitor targets from the search-found devices 30 (monitor-target extraction information), and extracts the candidate devices 30 to be monitor targets based on the specified monitor-target extraction information (step S23). This process is described with reference to FIG. 5.

Figure 5:
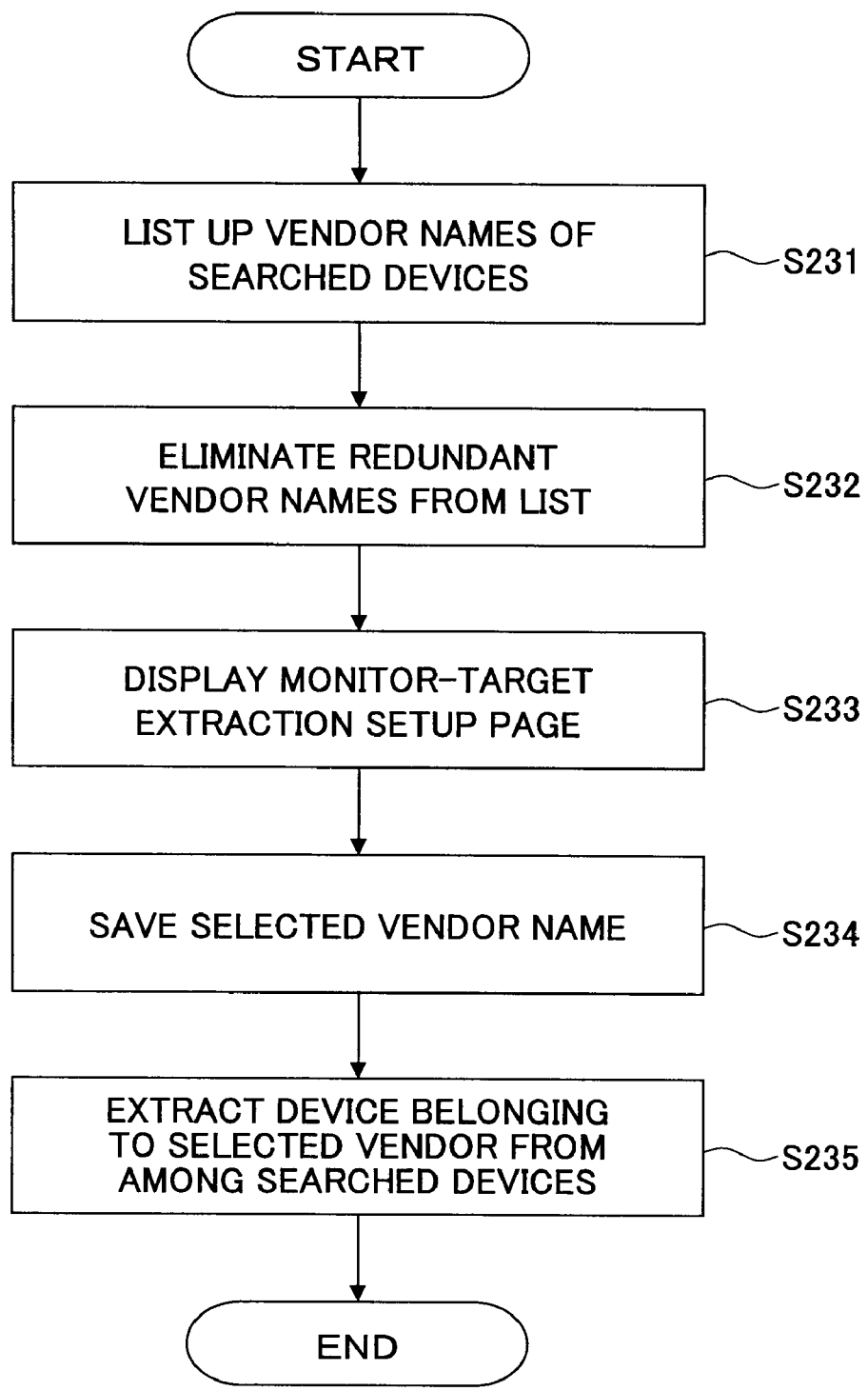
FIG. 5 is a flowchart of a process for specifying the monitor-target extraction information.

FIG. 5 is a flowchart of a process for specifying the monitor-target extraction information. First, the monitoring service 212 identifies vendor names of the search-found devices 30, and creates a list of the vendor names of all of the search-found devices 30 (step S231). When the search result device information is acquired as MIB information, the vendor names of the devices 30 can be identified according to "sysDescr" in the MIB information.

Next, the monitoring service 212 generates a logical sum of the vendor names in the created list to eliminate any redundant vendor names from the list (step S232). By performing this process, if vendor names are listed as A, B, C, A, A, B, a list with only A, B, and C will be created. Hereinafter, a list from which redundant vendor names are eliminated is referred to as a "vendor name list". Next, the UI application 211 displays a page on a display device of the client PC 20 for causing a user to specify the monitor-target extraction information (hereinafter, "monitor-target extraction setup page") (step S233).

Figure 6:
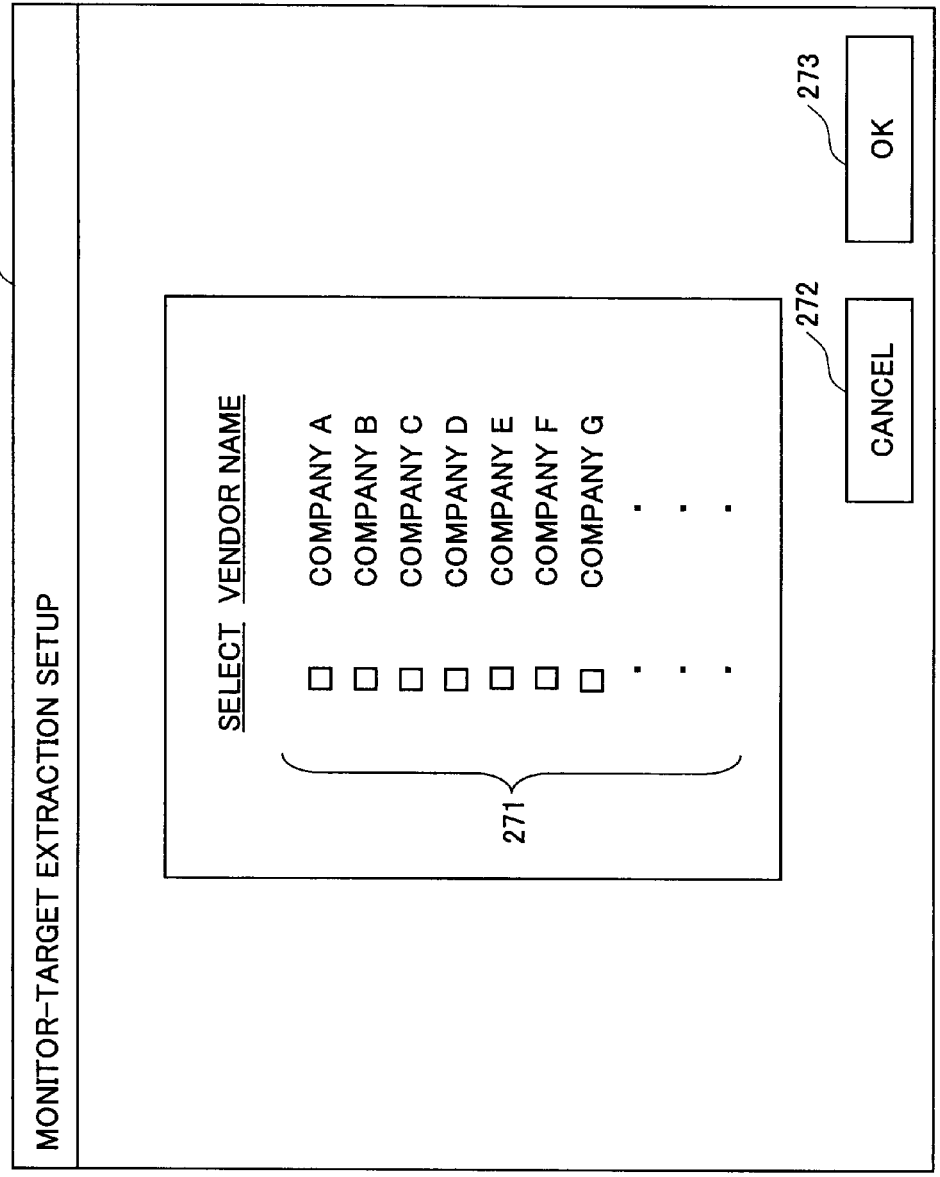
FIG. 6 is an example of a displayed monitor-target extraction setup page.

FIG. 6 is an example of a displayed monitor-target extraction setup page. In FIG. 6, a monitor-target extraction setup page 270 is displaying a vendor name list. There is a tick box 271 provided for each vendor name. When a cancel button 272 is clicked, all of the tick marks in the tick boxes 271 are cleared.

In the monitor-target extraction setup page 270, the user ticks the tick box 271 of the vendor name that is to be a monitor target. When the user clicks an OK button 273, the UI application 211 saves the vendor name that is ticked (selected) (hereinafter, "monitor target vendor name") in a storage device of the client PC 20 (step S234). The user can select plural monitor target vendor names. Subsequently, the monitoring service 212 extracts a device from among the search-found devices 30 whose vendor name is among the monitor target vendor names (or coincides with the monitor target vendor name) (step S235). In the present embodiment, the vendor names whose tick boxes 271 are ticked correspond to the monitor targets; however, the vendor names whose tick boxes 271 are ticked can correspond to those that are not monitor targets. Furthermore, in the present embodiment, the monitor-target extraction setup page 270 is configured to display the vendor name list including vendor names of the search-found devices; however, it is possible for the monitor-target extraction setup page 270 to display a vendor name list registered beforehand. Nevertheless, by displaying a vendor name list including vendor names of the search-found devices as in the present embodiment, the options can be appropriately narrowed down.

Referring back to FIG. 3, the monitoring service 212 sends the search result device information to the order support server 10, which search result device information represents the devices 30 extracted based on the monitor target vendor name (step S24).

The order support program 11 registers the received search result device information into a predetermined database (hereinafter, "device database") (step S25).

FIG. 7 is an example of a device information table corresponding to the device database. As shown in FIG. 7, in a device information table 12, a MAC address, a vendor name, a model name, a serial number, a monitor flag, remarks, the supply status, and a mail flag are registered and managed for each of the search-found devices 30. The MAC address, the vendor name, the model name, and the serial number, which are included in the search result device information, are directly registered in the device information table 12. More information such as an IP address is also registered, although not shown as a matter of convenience. In step S24, the search result device information, which is relevant to the devices 30 extracted based on the monitor target vendor name, is sent to the order support server 10. Thus, the device information table 12 does not include the search result device information for all of the devices 30, but only for the devices 30 relevant to the monitor target vendor names.

The monitor flag is flag information indicating whether the corresponding device 30 is specified to be a monitor target of the monitoring service 212. If the device is a monitor target, "Yes" will be registered; if the device is not a monitor target, "No" will be registered. As an initial value, "Yes" is registered. However, the initial value can be a NULL value. "Remarks" is a field in which a user can arbitrarily register information in association with the corresponding device.

The supply status is a field for registering information used to identify the status of the supply. In the present embodiment, any one of N (Normal), Ne (Near End), and E (End) is to be registered. The initial value can be "N" or a NULL value. The mail flag is described below.

Next, the order support program 11 sends a URL of a Web page (hereinafter, "search result device list page") displaying a list of the search result device information to the monitoring service 212 (step S26). The monitoring service 212 starts the Web browser 22 by taking the received URL as an argument (step S27). When the Web browser 22 starts, the Web browser 22 sends an HTTP request requesting the search result device list page based on the URL specified as the argument to the order support server 10 (step S28). When the HTTP request is received, the order support program 11 generates a search result device list page based on the information registered in the device information table 12, and returns the search result device list page to the Web browser 22 (step S29).

FIG. 8 is an example of a displayed search result device list page. In the following description for FIG. 8, numbers inside ( ) correspond to reference numerals in FIG. 8. As shown in FIG. 8, a search result device list page 240 displays, for each device 30 found as a result of the search, a serial number, a MAC address, an IP address, a model name, and a vendor name. Furthermore, the search result device list page 240 includes, for each device 30, a column (241) for inputting remarks and a tick button (242) for selecting whether to specify the corresponding device 30 as a monitor object to be monitored by the monitor program 21. The user can input a remark and select whether the device 30 is to be a monitor target for each device 30 in the search result device list page 240. In the present embodiment, when the tick button (242) is ticked, it is determined that the corresponding device 30 is selected as a monitor object. In the remarks column (241), the user can arbitrarily input any kind of information. For example, information that would facilitate the operation of replacing consumable elements, such as the location of the device 30, can be input.

The search result device list page 240 does not display all of the search-found devices, but only the devices extracted (narrowed down) based on the monitor target vendor names. As the monitor target vendor names are specified, the number of devices 30 displayed in the search result device list page 240 can be reduced in a case where an office is provided with many devices 30 of plural vendors. Accordingly, it is possible to alleviate the workload of finding the devices 30 that are monitor targets from among the devices 30 displayed in the search result device list page 240. Particularly, in recent years and continuing, it is not uncommon for there to be a mix of devices 30 of plural vendors, and therefore it is effective to extract the candidate devices of monitor targets based on the monitor target vendor names.

In the search result device list page 240, the user inputs a remark on each device 30, selects whether to monitor each device 30, and clicks a send button 243. Then, the Web browser 22 sends an HTTP request to the order support server 10, requesting to register the remarks input and the selections made regarding the necessity of being monitored regarding the devices 30 (step S30). The order support program 11 additionally registers, in the device information table 12, the remarks input and the selections made regarding the necessity of being monitored for the devices 30 based on the received HTTP request (step S31). That is, as to the "monitor flag" in the device information table 12, "Yes" is registered for devices to be monitor targets, and "No" is registered for devices that are not to be monitor targets.

FIG. 9 is an example of the device information table 12 including selections as to whether the devices are to be monitored, and remarks. The device information table 12 shown in FIG. 9 includes the information of "Omori 4F", indicating the location of the device 30 in the entry of the first line. The monitor flags indicate that the devices in the entries of the first through fourth lines are to be monitor targets while the devices in the entries of the fifth through seventh lines are not to be monitor targets.

The process of user registration is completed. Other than when the monitor program 21 is installed, the user can add other devices 30 as monitor objects by selecting menu items. Similarly, the monitor program 21 registers search result device information and causes the client PC 20 to display a search result device list page. Furthermore, the UI application 211 can display the monitor-target extraction setup page 270 according to menu items selected by the user, so that the user can select monitor target vendor names once again. In this case, the monitor target vendor names saved in the storage device are updated according to editing results in the monitor-target extraction setup page 270. In the present embodiment, vendor names are used as information for extracting candidate devices for monitor targets; however, attribute values of one of the attributes in the device information other than vendor names can be used as information for extracting candidate devices for monitor targets. For example, the candidate devices for monitor targets can be extracted based on the model name, information registered in remarks, or a combination of the vendor name, the model name, and information registered in remarks. Furthermore, the candidate devices for monitor targets can be extracted in the order support server 10. In this case, the monitor target vendor names, etc., are registered beforehand in the order support server 10. For example, when the search result device information is received in step S24, the order support program 11 can extract the candidate devices for monitor targets from the search result device information based on the registered monitor target vendor names.

Subsequently, the monitoring service 212 automatically repeats searching (or periodically searches) for the devices connected to the network 50 (step S32). The monitoring service 212 extracts, from the search-found devices 30, devices 30 that are relevant to the monitor target vendor names saved in the storage device of the client PC 20 (step S33), and sends search result device information of the extracted devices 30 to the order support server 10 (step S34).

The order support program 11 renews the device information table 12 based on the received search result device information (step S35). The configuration of the network 50 is periodically examined, and the device information table 12 is renewed based on the examination results. Therefore, it is possible to minimize inconsistencies between the contents of the device information table 12 and the configuration of the network 50.

Figure 10:
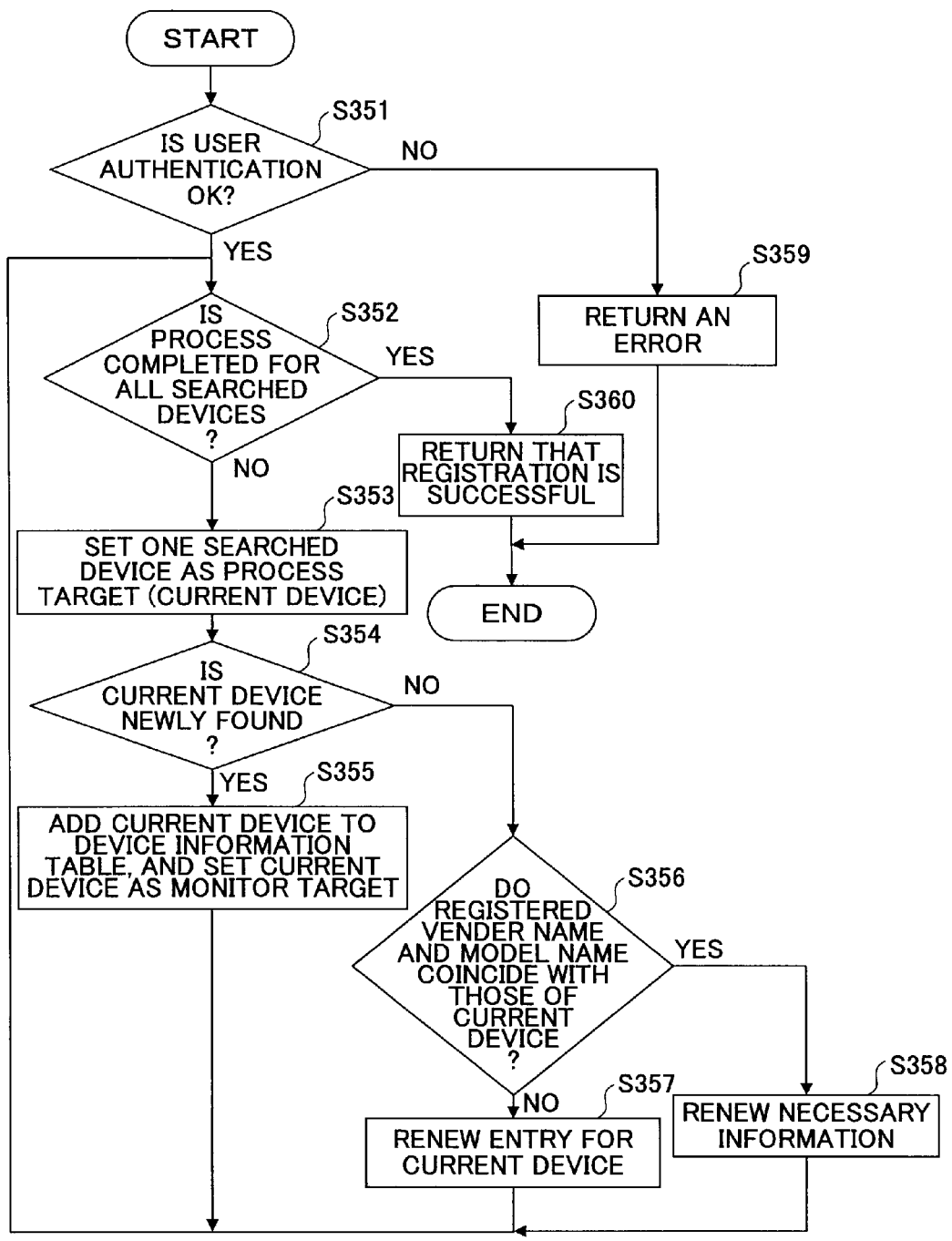
FIG. 10 is a flowchart of a process of renewing the device information table performed by an order support program.

A description is given of details on the process of renewing the device information table 12 executed in step S35. FIG. 10 is a flowchart of the process of renewing the device information table 12 performed by the order support program 11. When search result device information is received, the order support program 11 performs user authentication based on a user ID and a password, which are sent from the monitoring service 212 together with the search result device information (step S351). When the user is authenticated (Yes in step S351), the order support program 11 performs processes from step S352 onward for each of the devices included in the search result device information.

First, one of the devices is taken as a process target (hereinafter, the device taken as a process target is referred to as "current device") (step S353). The order support program 11 determines whether the current device is a newly found device (hereinafter, "new device") (step S354). This determination is made by using the MAC address of the current device as a key to search whether the device information table 12 includes an entry with the corresponding MAC address. If such an entry is not found, order support program 11 determines that the current device is a new device.

When the order support program 11 determines that the current device is a new device (Yes in step S354), the order support program 11 registers an entry of the current device in the device information table 12 (step S355). At this time, the current device is made to be a monitor target. That is, "Yes" is registered as the monitor flag of the newly added entry. If the process is performed automatically, there will be no appropriate timing for asking the user whether the new device is to be a monitor target, and therefore the order support program 11 automatically registers "Yes" as the monitor flag. The reason why "Yes" is registered instead of "No" is that the user has installed the monitor program 21 for the purpose of monitoring the supplies of the devices 30 connected to the network 50. Thus, according to such a user's intention, it seems reasonable that a new device is set as a monitor target by default. Furthermore, from the viewpoint of the order site, sales of supplies can be promoted by having as many monitor target devices as possible.

On the other hand, when an entry with the same MAC address as the current device is already included (No in step S354), the order support program 11 determines whether the vender name and the model name in the entry are the same as those of the current device (step S356). These items are checked as it is not necessarily ensured that the device in the entry coincides with the current device just because the MAC addresses are coinciding. That is, a device may acquire a MAC address by a network card, and such a network card may be inserted into another device. Therefore, it is not always possible to correctly identify a device based on a MAC address.

If the entry includes the same MAC address as the current device, but at least one of the vendor name and the model name included in the entry does not coincide with that of the current device, the information in the entry that does not coincide with that of the current device will be renewed and the monitor flag will be changed to "Yes" (step S357). FIG. 11 illustrates an example of the renewed device information table 12 in a case where the model name in an entry of the device information table 12 does not coincide with that of the current device.

In FIG. 11, the entry in the fifth row includes a model name that does not coincide with that of the current device, and is thus renewed. The model name in the entry in the fifth row is changed to the model name included in the search result device information of the current device, and the monitor flag is changed to "Yes". The reason why the monitor flag is changed to "Yes" is because it is considered reasonable to treat such a device as a new device.

Meanwhile, if there already exists an entry including the same MAC address as the current device (No in step S354), and the vendor name and the model name included in the entry coincide with those of the current device (No in step S356), the order support program 11 will determine that the current device is already registered with this entry. However, if there are any changes in attributes of the current device (e.g., the serial number), an item of the corresponding attribute in the entry is renewed (step S358). However, the monitor flag is not changed. That is, even if the monitor flag is indicating "No", it is left unchanged. If the monitor flag indicating "No" is automatically changed, it will contradict the user's intention of purposely excluding this device from the monitor targets.

When the processes of steps S353 through S358 are performed for all of the devices included in the search result device information (Yes in step S352), the order support program 11 returns a report to the monitoring service 212 that the search result device information is successfully registered (step S360), and the process ends. If user authentication is unsuccessful (No in step S351), the device information table 12 will not be renewed; furthermore, the order support program 11 will return error information to the monitoring service 212 (step S359).

Figure 12:
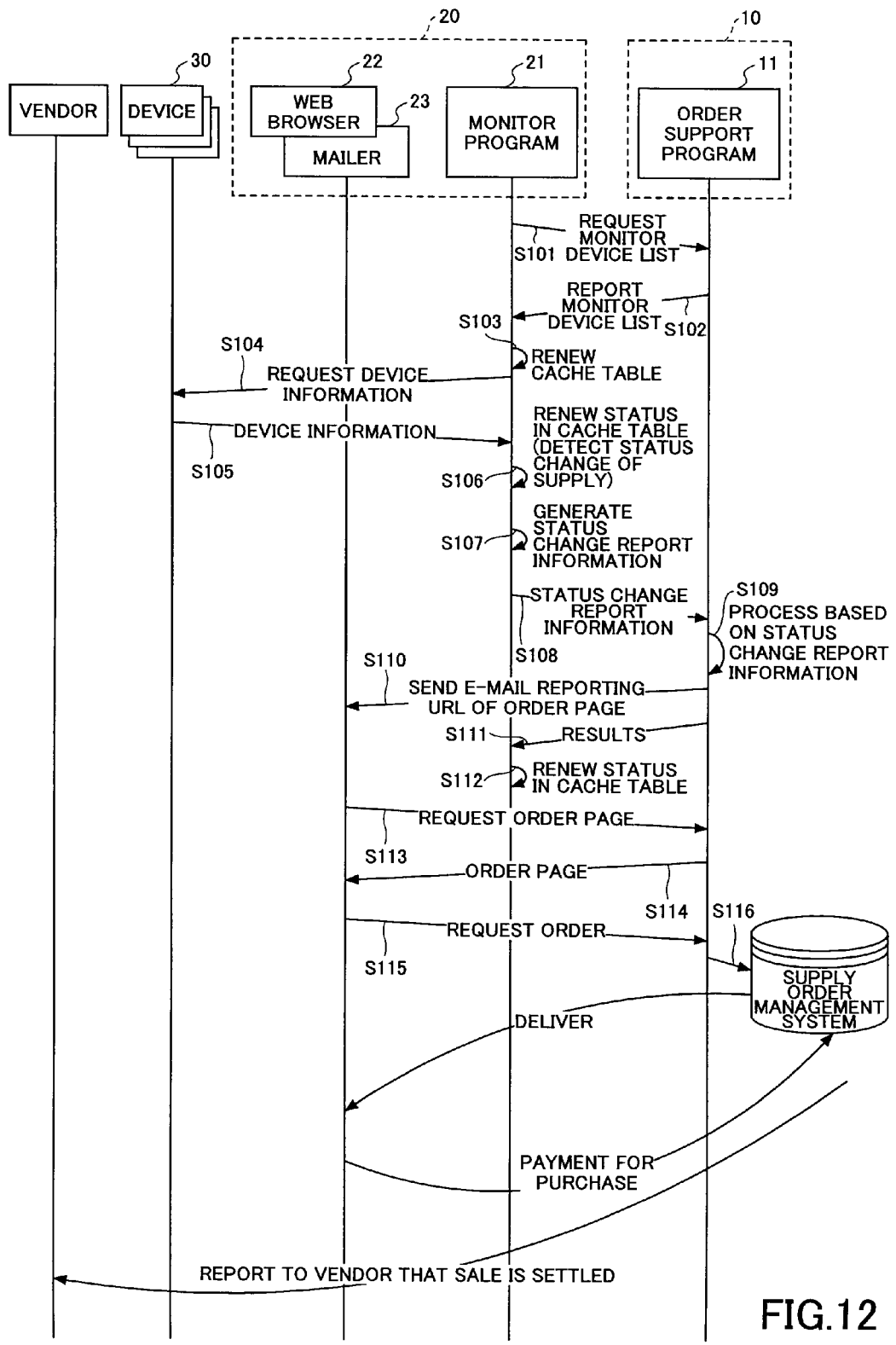
FIG. 12 is a sequence diagram for describing a process of monitoring the devices performed by the order support system.

Next, a description is given of a process performed by the order support system 1 when the monitor program 21 (monitoring service 212) installed in the client PC 20 monitors the devices 30. FIG. 12 is a sequence diagram for describing the process of monitoring the devices 30 performed by the order support system 1.

When it is time to monitor the status of the devices 30, which time occurs repeatedly (e.g., periodically), the monitoring service 212 requests a list of devices 30 that are monitor objects (hereinafter, "monitor devices") from the order support server 10 (step S101). The order support program 11 lists the monitor devices based on the monitor flags in the device information table 12 and returns the list (monitor device list) to the monitoring service 212 (step S102). Other than the predetermined periodic time points for monitoring the devices 30, the monitoring service 212 can monitor the devices 30 at any time point according to, for example, a menu item selected by the user. In this manner, the monitoring service 212 itself does not manage whether each device is a monitor target, but the monitoring service 212 identifies a monitor device by asking the order support program 11. With such a configuration, the monitoring service 212 can be implemented with a simplified configuration, and therefore the processing workload can be reduced.

When the monitor device list is received, the monitoring service 212 renews a cache table based on the monitor device list (step S103). The cache table is used by the monitoring service 212 for managing the statuses of supplies of the monitor devices, which cache table is constructed in a memory of the client PC 20, for example.

FIG. 13 illustrates an example of the cache table. As shown in FIG. 13, information for each monitor device is registered in and held by a cache table 27. The information includes a MAC address, a vendor name, a model name, a serial number, remarks, a monitor status, a supply status, and a report flag. In step S103, based on the received monitor device list, the MAC address, the vendor name, the model name, the serial number, and the remarks are registered or renewed. For example, if there is a MAC address of a monitor device in the received monitor device list that is not included in the cache table 27, the monitoring service 212 will add a new entry into the cache table 27 for the corresponding monitor device. If an entry in the cache table 27 has the same MAC address as that of a monitor device included in the received monitor device list, but the entry includes different information from that of the corresponding monitor device (the vendor name, the model name, the serial number, or the remarks), the different information of the entry is renewed. Furthermore, if the cache table 27 includes an entry having a MAC address that is not included in the monitor device list, the monitoring service 212 will delete such an entry. That is, the cache table 27 only holds entries corresponding to devices that are presently specified as monitor devices. The monitor status, the supply status, and the report flag in the cache table 27 are items to be renewed in processes described below, and details are given in each case.

Next, based on SNMP, the monitoring service 212 requests the device 30 (monitor device) registered in an entry of the cache table 27 to provide MIB information acting as device information (step S104). The requested MIB information includes at least the toner status, and may also include information on the status of other supplies. Each device 30 returns the requested MIB information to the monitoring service 212 (step S105).

In implementing the present invention, the device information is not necessarily limited to MIB information, and the protocol for inquiring about the device information is not limited to SNMP. However, by using standardized technology, the device information of devices 30 of different vendors can be acquired by the same procedure, and therefore standard technology such as MIB and SNMP is preferably used.

When device information is acquired (polled) from all of the monitor devices, the monitoring service 212 renews the monitor status, the supply status, and the report flag in the cache table 27 based on the device information (step S106). As to the monitor status, "OK" is registered for an entry corresponding to a device whose device information is successfully acquired, and "NG" is registered for an entry corresponding to a device whose device information is not successfully acquired. As to the supply status, supply status information included in the acquired device information, such as the toner status, is registered. As to the report flag, "not reported" will be registered if the value of the supply status has changed. That is, the monitoring service 212 detects the supply status by comparing the supply status registered in the cache table 27 before the cache table 27 is renewed, with the supply status information included in the newly acquired device information. If the monitoring service 212 detects that the status of the supply has changed, the monitoring service 212 sets the report flag of the entry in the cache table 27 to "not reported". The report flag is used for determining whether the change in the supply status has been reported to the order support program 11.

FIG. 14 illustrates an example of the cache table 27 renewed based on polling results of device information. FIG. 14 illustrates the cache table 27 having been renewed from that shown in FIG. 13. Specifically, in the entry in the first row, the supply status has changed from "normal" (there is no shortage) to "near end" (nearly finished). Accordingly, the value of the report flag has been renewed to "not reported". Similarly, in the entry in the fourth row, the supply status has changed from "near end" to "end" (finished), and therefore the report flag has been renewed to "not reported". In the entries in the third and fifth rows, the supply statuses are unchanged, and therefore the value of the report flag is not renewed. In the entry in the second row, the monitor status is indicating "NG". This is because the device information of the device 30 corresponding to this entry was not successfully acquired. In this case, neither the supply status nor the value of the report flag is renewed.

Next, the monitoring service 212 generates status change report information (step S107). The monitoring service 212 generates status change report information for a device corresponding to an entry whose value of the report flag is "not reported" in the cache table 27. Therefore, according to the cache table 27 shown in FIG. 14, status change report information is generated for the devices corresponding to the entries in the first, third, and fourth rows.

FIG. 15 is an example of the structure of status change report information. As shown in FIG. 15, the status change report information includes header information and device information.

The header information includes the date and time, a user ID, and a password. The date and time are the date and time of transferring the device information. The user ID and password are input when the monitor program 21 is installed, which are the saved user ID and password. Thus, the header information is not acquired from the device 30.

The device information is as described above. Specifically, the device information is acquired as MIB information from the device 30, including a vendor name, a model name, a serial number, a MAC address, an IP address, a toner ID (information for specifying a toner bottle: in the case of a color device, a toner ID is given for each color; in the case of a monochrome device, only one ID is given), a toner name, a toner status, a toner level, a toner name (character string), a toner name (code), and a total counter value, of the device 30. This information is defined by public MIB (standard MIB), and can be acquired from any device 30 regardless of the vendor.

The toner status indicates the status of the toner. The total counter value indicates the total number of printed sheets. The monitor program 21 detects "toner end" (toner has finished) based on the toner status. The monitor program 21 determines the extent to which a photoconductor, a fixing unit, or a developer is consumed based on the total counter value. However, the toner status indicated by the standard MIB cannot specify the color of the toner that has been expended (finished).

Accordingly, the device information according to an embodiment of the present invention also includes a monochrome counter value, a color counter value, a cyan counter value, a magenta counter value, a black counter value, and a red counter value. These are uniquely defined by a vendor as private MIB (extended MIB).

For example, in an embodiment of the present invention, it is assumed that only the devices 30 made by a manufacturer A provide the extended MIB. Therefore, device information of the devices 30 made by manufacturer A includes these values; however, these values are blank in device information of the devices 30 made by manufactures other than manufacturer A.

The monochrome counter value is the number of sheets printed out by monochrome printing. The color counter value is the number of sheets printed out by color printing. The cyan counter value, the magenta counter value, the black counter value, and the red counter value are the numbers of sheets printed out by using toners of the respective colors. Therefore, if the device 30 is made by manufacturer A, it is possible to detect the end of toner by each color.

In the cache table 27 shown in FIG. 14, etc., there is one entry allocated for each monitor device as a matter of convenience. However, in the case of managing the statuses of plural supplies (e.g., toner statuses and total counter values of each CMYK), an entry can be allocated for each supply. The information to be included in the status change report information is not limited to that shown in FIG. 15; the information to be included can be arbitrarily determined according to need.

Next, the monitoring service 212 sends the generated status change report information to the order support program 11 (step S108). The status change report information of different devices is preferably sent at once (collected in a single message) for the purpose of reducing the communication workload; the overhead can be decreased compared to the case of sending the information with separate messages.

Having received the status change report information, the order support program 11 performs processes based on the status change report information, such as renewing the device information table 12 and determining which device has a shortage in a supply (step S109). Details of the process performed in this step are described below.

Next, the order support program 11 generates a Web page (hereinafter, "order page") for ordering a short supply, creates an e-mail (hereinafter, "shortage report e-mail") for reporting a shortage in a supply, and sends the shortage report e-mail to the e-mail address of the user (step S110). The shortage report e-mail includes the URL of the order page. Each shortage report e-mail is given an ID (hereinafter, "mail ID"). Information for identifying the device 30 that is the subject of the shortage report e-mail, such as the serial number, information for identifying the user such as the user ID or the e-mail address, and the sent date and time are saved together with the mail ID as transmission history of the shortage report e-mail.

Figure 16:
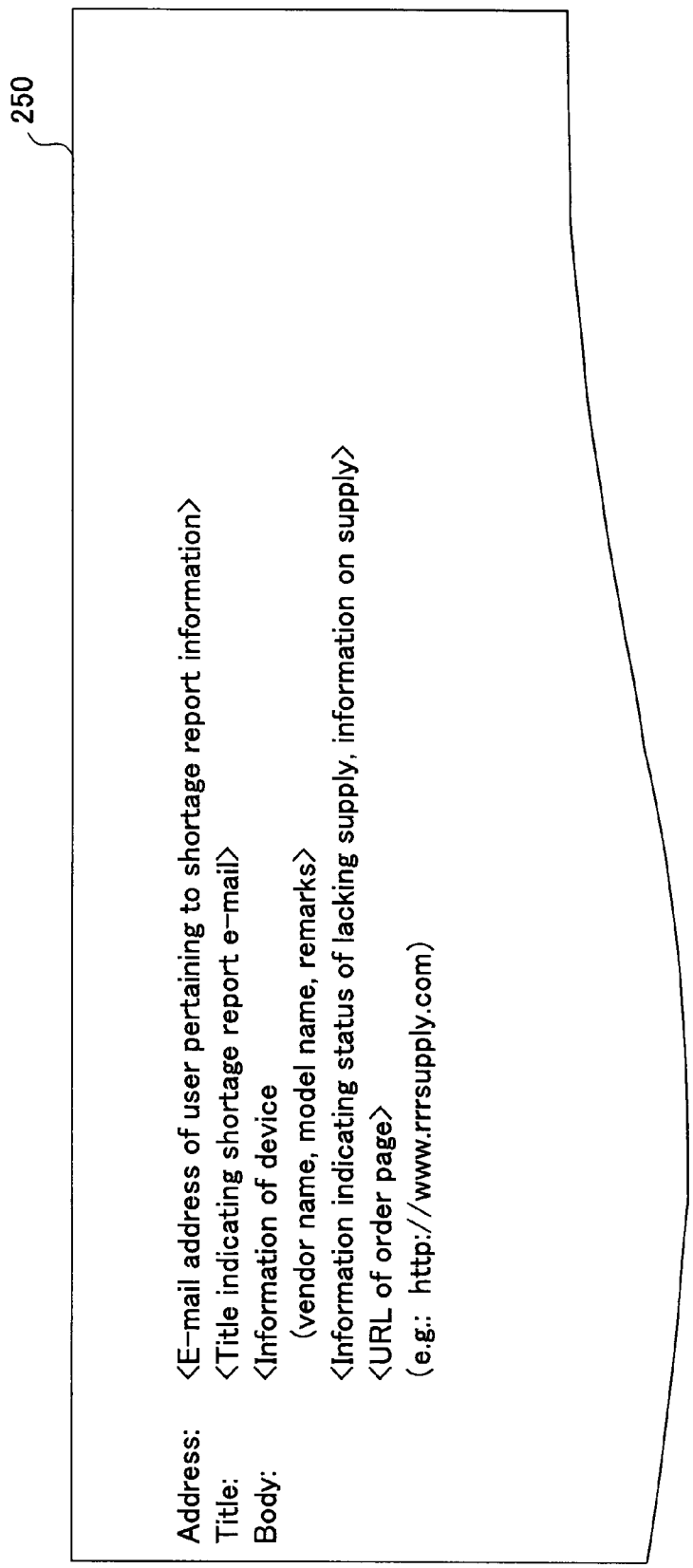
FIG. 16 illustrates an example of a shortage report e-mail.

FIG. 16 illustrates an example of the shortage report e-mail. In a shortage report e-mail 250 shown in FIG. 16, character strings in < > do not indicate specific values but describe the contents of the information to be input to the corresponding position.

As shown in FIG. 16, an e-mail address of a user pertaining to the status change report information is input as the destination of the shortage report e-mail 250. The e-mail address of the user can be specified by searching the user database, using the user ID and the password included in the status change report information as search keys. At the time of user registration, a user ID and a password are registered together with an e-mail address in the user database.

The title of the shortage report e-mail 250 indicates that it is a shortage report e-mail. The body of the shortage report e-mail 250 contains information regarding the device 30 pertaining to the status change report information, information on the lacking supply, the URL of the order page, etc.

The information regarding the device 30 includes a vendor name and a model name of the device 30 and remarks. This information can be acquired from the device database by using a serial number, a MAC address, or an IP address included in the status change report information as a search key. If the lacking supply is toner, the information on the lacking supply includes information such as a toner status, a toner ID, and a toner name included in the status change report information. If shortages in plural supplies occur at the same time in a single device 30, a single shortage report e-mail 250 with information indicating the shortages of the plural supplies is created, and the shortages of the plural supplies are reported.

After sending the shortage report e-mail 250, in step S111, the order support program 11 returns, to the monitoring service 212, to process results of the series of processes performed according to the status change report information received in step S108. If the process results indicate that the process has been properly completed (that is, the status change report information is properly processed), the monitoring service 212 will renew the report flag in the cache table 27 from "not reported" to "reported" (step S112).

FIG. 17 illustrates an example of the renewed cache table 27 when the status change report information has been properly received. FIG. 17 illustrates the cache table 27 having been renewed from that shown in FIG. 14. In the cache table 27 shown in FIG. 17, in the entries in the first, third, and fourth rows, the report flags have been renewed from "not reported" to "reported". By renewing the values of the report flags, it is possible to prevent status change report information from being sent redundantly after the change of supply status has been properly processed. Accordingly, the communication amount can be reduced, and the shortage report e-mail 250 can also be prevented from being sent redundantly.

The user who has viewed the shortage report e-mail 250 with the mailer 23 at the client PC 20 can acknowledge the shortage in the supply even when printing is not being executed. Furthermore, if the location of the device 30 is input in the remarks, the effort required for finding the device 30 will be reduced.

When the user clicks the URL of the order page written in the shortage report e-mail 250, the mailer 23 causes the Web browser 22 to start by taking the clicked URL as an argument. When the Web browser 22 starts, the Web browser 22 sends, to the order support server 10, an HTTP request requesting the order page based on the URL specified by the argument (step S113). In response to the received HTTP request, the order support program 11 returns the order page to the Web browser 22 (step S114). The Web browser 22 displays the received order page.

FIG. 18 is an example of the order page. As shown in FIG. 18, an order page 260 includes an area 261 displaying information regarding the device 30 with a lacking supply (manufacturer (vendor) name, model name, serial number, remarks (location)). An area 261A displays the name of the lacking supply. An area 262 displays a list of various supplies corresponding to the device 30, so that orders can be placed for the various supplies. Specifically, for each supply, a product name is displayed, and the quantity to be purchased can be input. As indicated by reference numeral 2621, the quantity necessary for the lacking supply is already input. Each product name provides a link to a Web page displaying descriptions of the corresponding product. An area 263 displays the purchase history of the corresponding user. Accordingly, redundant purchases can be prevented from being made by the user.

The purchase history is registered in the user database for each user. That is, every time a product is ordered via the order page 260, information on the ordered product is additionally registered in the user database.

The order page 260 shown in FIG. 18 is reporting that there is a shortage of the yellow toner. As described above, with the standard MIB, the specific color of the lacking toner cannot be identified. Thus, the order page 260 shown in FIG. 18 indicates the results determined based on information registered in the extended MIB. In this manner, a manufacturer participating in the order support system 1 can differentiate itself from another manufacture in terms of services provided with the order support system 1 by defining its own extended MIB. Specifically, assuming that toner end is detected (toner is finished) in the device 30 made by another manufacturer, the order page 260 does not report the specific color of the finished toner. It is possible to exclude supplies of the devices 30 made by other manufacturers from objects for placing orders using the order support system 1; however, in consideration of the user's convenience, supplies of the devices 30 made by other manufacturers can also be ordered in the present embodiment.

When the user clicks an order button 2622 in the order page 260, the Web browser 22 sends an HTTP request to the order support server 10, requesting to order the product (step S115).

When the HTTP request is received, the order support program 11 records information for providing part of the profit to be made by the order request to a vendor associated with the user (step S116). Specifically, a database (hereinafter, "vendor database") for managing the sales of supplies sold with the order support system 1 is constructed, and the contents of the current order (e.g., total amount of orders) are recorded in the sales section of the vendor database. The vendor concludes a participation contract with the manufacturer to participate in the order support system 1. Accordingly, an entry to the vendor database is created. Furthermore, the vendor is given a vendor ID. The vendor is identified by the vendor ID in the order support system 1. In step S116, the user making the HTTP request can be identified by associating the user ID with a session ID of a session with the Web browser 22. Based on this association, a user ID can be identified from the session ID.

The order support program 11 sends an order instruction to the supply order management system. This instruction includes the address for delivering a supply, which address is registered in the user database. By sending the order instruction to the supply order management system, the ordered product is actually delivered to the user. When the user makes the payment, it is recorded in the vendor database that the sale of the current order has been settled. When the sale is settled, the vendor can be given an allowance such as sales promotion fees in accordance with the sale from the manufacturer.

Next, a description is given of details on the process performed in step S109 of FIG. 12. FIG. 19 is a flowchart of a process performed by the order support program 11 according to the status change report information.

When the status change report information is received, the order support program 11 performs user authentication based on the user ID and the password sent together with the status change report information from the monitoring service 212 (step S401). When the user is successfully authenticated (Yes in step S401), the order support program 11 performs the processes from step S402 onward for each device whose status change report information is received.

First, one of the devices is taken as a process target (hereinafter, the device taken as a process target is referred to as "current device") (step S403). The order support program 11 determines whether the current device is registered in the device information table 12 (step S404). This determination is made by using the MAC address of the current device as a key to search and determine whether the device information table 12 includes an entry with the corresponding MAC address. If the current device is not registered (No in step S404), the order support program 11 will register an entry for the current device in the device information table 12 (step S405). At this time, the current device is made to be a monitor target. If the order support program 11 determines that the current device is registered based on the MAC address, the order support program 11 can perform the process described with reference to steps S356 through S358 of FIG. 10.

Next, the supply status information of the current device included in the status change report information is reflected (transcribed) to the status in the device information table 12 (step S406). Next, based on the status of the current device registered in the device information table 12, the order support program 11 determines whether there is a shortage in a supply in the current device (that is, whether there is a supply having a status that is "Ne" (near end) or "E" (end)) (step S407). If there is a shortage in a supply (Yes in step S407), the order support program 11 determines whether the value of the mail flag is "Yes" in an entry corresponding to the current device in the device information table 12 (hereinafter, "current entry") (step S408). The mail flag will indicate "Yes" if the shortage report e-mail 250 has been sent. That is, if the value of the mail flag is "Yes", it will mean that the shortage report e-mail 250 regarding the current device has been sent in the past.

If the mail flag is indicating "Yes" (Yes in step S408), the order support program 11 checks whether the shortage report e-mail 250 will be sent redundantly (i.e., check for redundant transmission) (step S409). To check for redundant transmission means to perform a process to determine whether a shortage report e-mail 250 including the same contents has been sent in the past; details of the process are described below. Upon checking for redundant transmission, if the order support program 11 determines that there is a low probability of redundant transmission and thus the shortage report e-mail 250 is to be sent ("send" in step S409), the order support program 11 will set the mail flag as "Yes" (step S410), and will send the shortage report e-mail 250 regarding the current device (step S410). This process corresponds to step S110 in FIG. 12. If the order support program 11 detects that there are shortages in plural supplies in step S407, the information on these shortages will be collected together and reported with a single shortage report e-mail 250. Accordingly, the number of shortage report e-mails 250 sent to a user can be reduced, thus mitigating the effort required by the user.

Upon checking redundant transmission, if the order support program 11 determines that there is a high probability of redundant transmission and thus the shortage report e-mail 250 is not to be sent ("do not send" in step S409), the order support program 11 will not send the shortage report e-mail 250 and end the process regarding the current device.

If the mail flag is indicating "No" (No in step S408), there is no possibility of redundantly sending the shortage report e-mail 250. Thus, the order support program 11 will not check for redundant transmission, will set the mail flag as "Yes" (step S410), and send the shortage report e-mail 250 (step S411).

If the order support program 11 determines that there are no shortages in the supplies of the current device in step S407, there will be no need to send the shortage report e-mail 250. Thus, the order support program 11 will set the mail flag as "No" (step S412), will not send the shortage report e-mail 250, and will end the process regarding the current device.

When the processes of steps S403 through S412 are performed for all of the devices included in the received search result device information (Yes in step S402), the order support program 11 returns a report to the monitoring service 212 that the search result device information is properly processed (step S414), and the process ends. This process corresponds to step S111 in FIG. 12. If user authentication is unsuccessful (No in step S401), the device information table 12 will not be renewed; furthermore, the order support program 11 will return error information to the monitoring service 212 (step S413).

Figure 20:
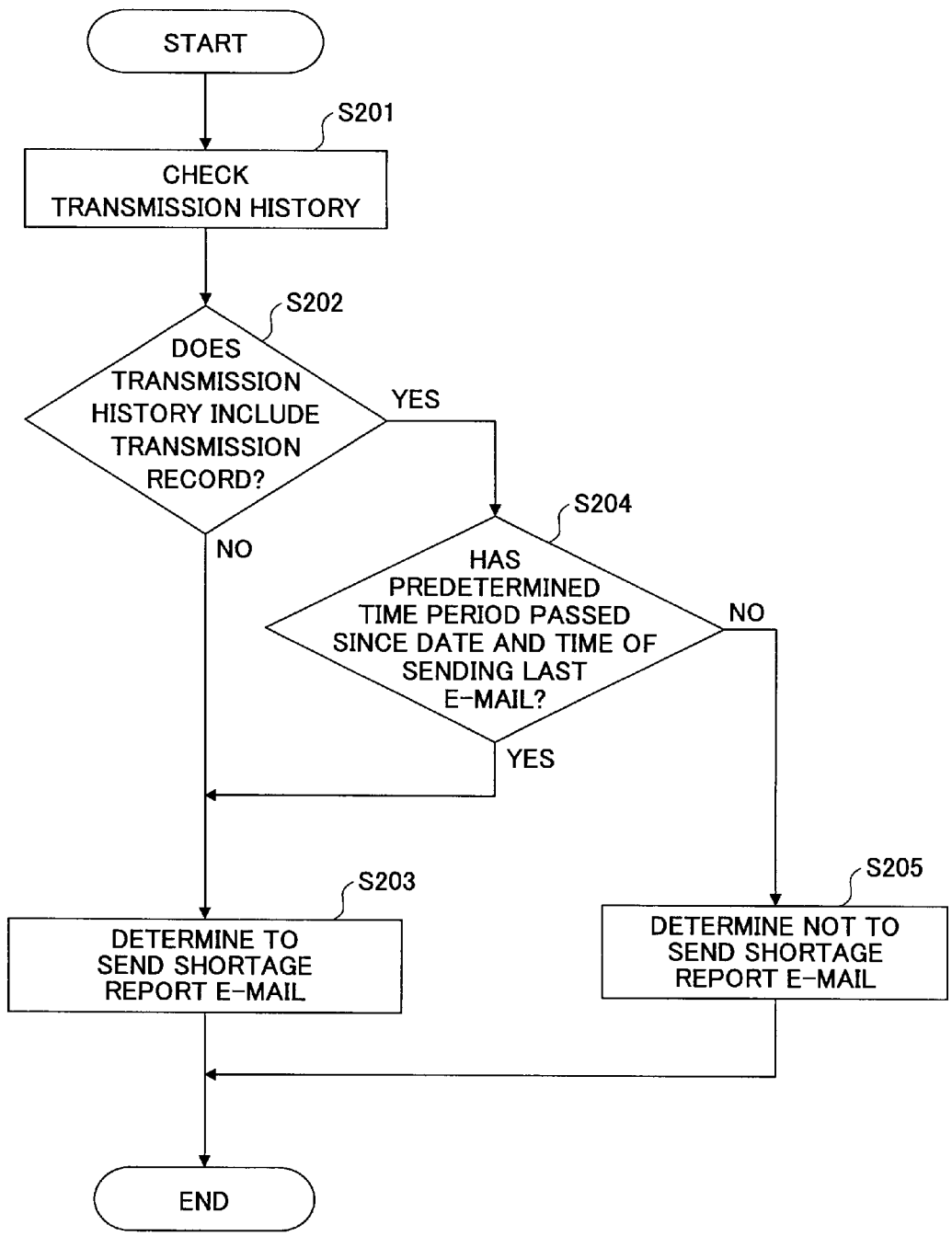
FIG. 20 is a flowchart of a process for checking whether the shortage report e-mail to be transmitted is redundant.

Next, a description is given of details on checking for redundant transmission of the shortage report e-mail 250, which is performed in step S409 of FIG. 19. FIG. 20 is a flowchart of a process for determining whether to send the shortage report e-mail. The significance of this process is described below.

The monitoring service 212 sends the status change report information based on the report flag in the cache table 27, and therefore, theoretically, the monitoring service 212 will not redundantly send the same status change report information. However, there may be cases where "toner end" is detected even when toner is still remaining in the toner bottle. In such a case, the user shakes the toner bottle (to loosen the toner) and then reattaches the toner bottle. However, after a while, "toner end" may be detected again for the same bottle. Accordingly, the supply status will change from "end" to "normal", and then back to "end" once again. In this case, although the toner bottle has not been replaced, the monitoring service 212 may repeatedly send status change report information reporting "toner end". This means that the same shortage report may be redundantly sent to the user. If the user does not notice this redundancy, the user may place redundant orders. In order to prevent such a circumstance, the order support program 11 performs the following process.

First, based on the serial number of the device 30 included in the shortage report information received from the monitoring service 212, the order support program 11 checks the date and time of the last (previous) shortage report e-mail sent regarding the corresponding device 30 by referring to the transmission history of shortage report e-mails (step S201).

When the transmission history does not include a transmission record that a shortage report e-mail has been sent to the corresponding device 30 (No in step S202), the order support program 11 determines to send a shortage report e-mail (step S203). If a shortage report e-mail has never been sent to the corresponding device 30, it means that a shortage report e-mail will not be sent redundantly.

If the transmission history includes a transmission record that a shortage report e-mail has been sent to the corresponding device 30 (Yes in step S202), the order support program 11 determines whether a predetermined period of time has passed since the date and time of sending the last shortage report e-mail (step S204). If a predetermined period has passed, the order support program 11 determines to send a shortage report e-mail (step S203); if a predetermined period has not passed, the order support program 11 determines not to send a shortage report e-mail to avoid redundancy (step S205).

FIG. 20 indicates an example of making the determination based on passage of time. However, it is also possible to record a total count as the transmission history, and determine not to send a shortage report mail if a difference indicated by the total count is below a predetermined threshold. Furthermore, it is also possible to delete the entire transmission history at regular time intervals, and refrain from sending a shortage report e-mail if the transmission history includes a transmission record that a shortage report e-mail has been sent to the same corresponding device 30.

Next, a description is given of functions of the UI application 211 in the monitor program 21. The UI application 211 is a program for displaying a page for specifying setting information of the monitoring service 212 (for example, the time intervals for acquiring device information) (hereinafter, "setting page") and a page for displaying monitor information of the devices acquired by the monitoring service 212 (hereinafter, "monitor page").

Figure 21:
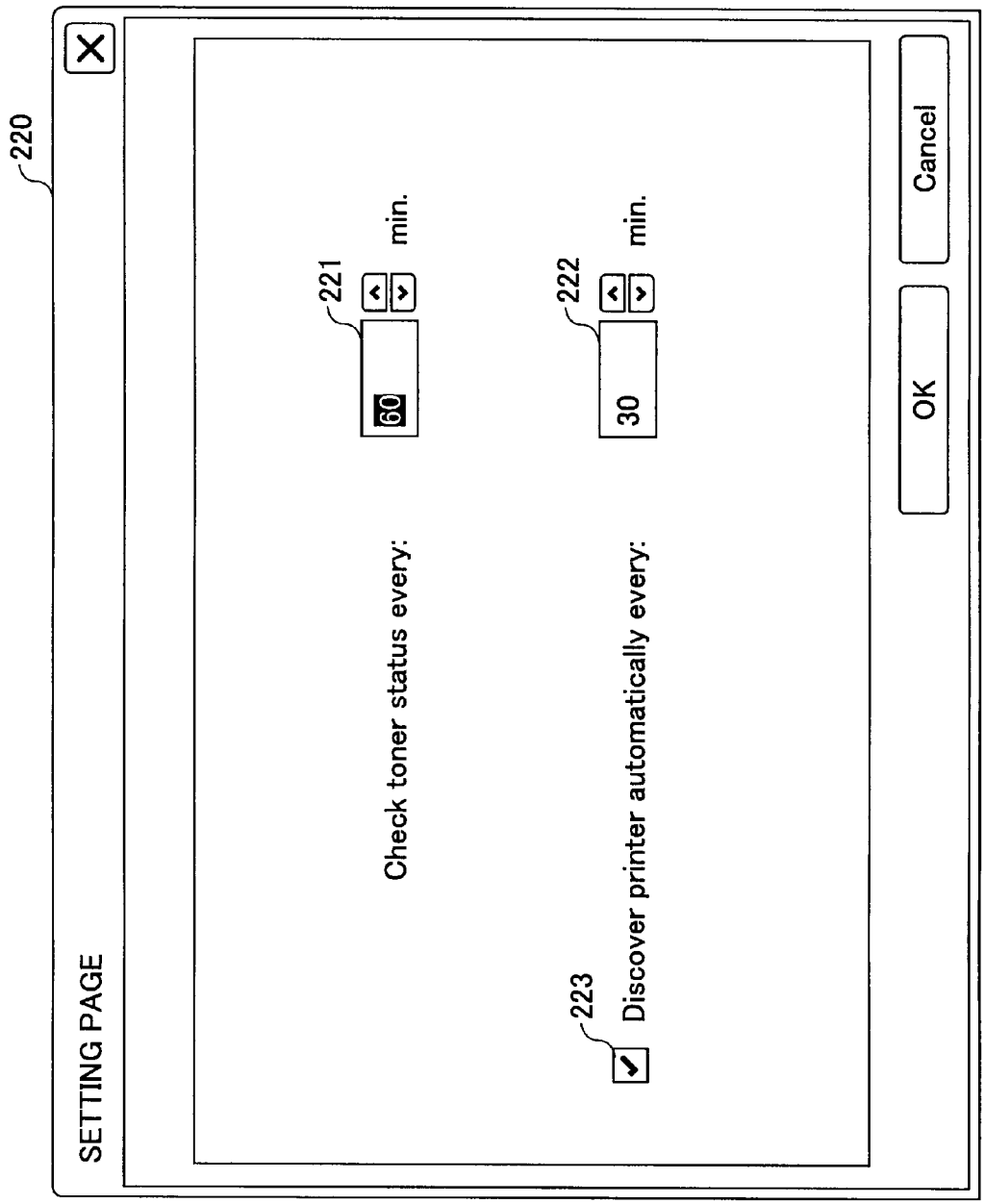
FIG. 21 is an example of a setting page.

The following describes an example of a setting page displayed by the UI application 211 in response to an instruction from the user. FIG. 21 is an example of a setting page 220. With the use of the setting page 220 shown in FIG. 21, a user can specify the time intervals (reference numeral 221) at which device information of the monitor devices is to be polled by the monitoring service 212, and the time intervals (reference numeral 222) at which devices in the network 50 are to be automatically searched for. The former is the time interval for executing step S104 of FIG. 12. The latter is the time interval for executing step S32 of FIG. 3. The setting value for the latter time interval can be invalidated with the use of a tick box 223. If the tick mark is cleared from the tick box 223, devices 30 will not be automatically searched for.

The following describes an example of a monitor page displayed by the UI application 211 in response to an instruction from the user. FIG. 22 is an example of a monitor page 230. The monitor page 230 shown in FIG. 22 displays the information acquired from the cache table 27 by the UI application 211. Accordingly, the monitor page 230 displays, for each monitor device, a vendor name, a model name, a serial number, a supply status, and remarks. With the use of the monitor page 230, the user can confirm the status of supply of each monitor device at any given timing. Each of the "?" marks denoted by a reference numeral 231 indicates that device information of a device with a "?" mark was not successfully polled. For example, polling may be unsuccessful when the device is not started up or is disconnected from the network 50.

As described above, the order support system 1 according to an embodiment of the present invention provides convenience and benefits to the user (client), the dealer, and the manufacturer of the device (30).

That is, a shortage of a supply of the device 30 is automatically detected, and a shortage report e-mail is automatically sent to the user's terminal. The user clicks a URL included in the shortage report e-mail so that the order page 260 is displayed. Accordingly, the user can easily order the understocked supply with the use of the order page 260. Hence, the user does not have to make the effort to identify a supply applicable to the device 30 or go out to purchase the supply at a mass merchandise outlet; therefore the user can reduce its costs required for procuring supplies.

The dealer can acquire a part of the profits gained with the supplies, and can thus increase its revenues.

The manufacture can provide an incentive for the dealer to prioritize devices made by itself over devices made by other manufacturers, and provide an incentive for the user to purchase devices made by itself. For example, a higher return rate can be offered for selling, via the order support system 1, a supply made by a certain manufacturer than selling a supply made by another manufacturer, or the return rate can be made zero if a supply made by another manufacturer is sold. Accordingly, if the dealer sells products of the certain manufacturer, the dealer will be able to gain more profits by selling supplies. Furthermore, if a user purchases a product of the certain manufacturer, the user will be able to expect detailed services such as identification of the color of the understocked toner.

Moreover, the manufacturer will be able to predict, to some extent, the usage period of each device 30 according to accumulated device information of the user. As a result, the manufacturer will be able to conduct sales activities effectively, such as prompting the user to make a replacement purchase.

In the above embodiment, the user concludes a registration contract for the order support system 1 with the dealer; however, the user does not necessarily have to conclude the registration contact with the dealer who has sold the device. A dealer who does not sell devices of a certain manufacturer may receive a dealer ID for the order support system 1 from the manufacturer. In this case, even if this dealer has not sold a device of the certain manufacturer, the dealer can receive returns from profits gained by selling supplies via the order support system 1.

According to one embodiment of the present invention, an order support system is provided, including a device information acquiring unit configured to search for one or more devices connected to a communication network and acquire device information from each of the devices found as a result of the search; a setting unit configured to obtain specified information used for extracting one or more devices to be candidates for monitor targets, wherein the information is specified according to a predetermined attribute included in the device information; an extracting unit configured to extract, based on the information obtained by the setting unit, one or more devices to be the candidates for the monitor targets from among the devices found as a result of the search; a monitor target selecting unit configured to display a list of the devices extracted by the extracting unit, from which one or more devices are to be selected as the monitor targets; a device monitoring apparatus configured to acquire status information of at least one consumable element in each of the devices selected as the monitor targets, wherein the device monitoring apparatus includes a status information sending unit configured to send the status information to an order-support apparatus; and the order-support apparatus configured to create an e-mail including a URL indicating a website used for ordering at least one consumable element that is detected as being deficient according to the status information received from the device monitoring apparatus, and to send the e-mail to an e-mail address registered in advance in association with the device corresponding to the deficient consumable element.

This order support system is capable of facilitating the procedures for replacing supplies of devices.

The present invention is not limited to the specifically disclosed embodiment, and variations and modifications may be made without departing from the scope of the present invention.

The present application is based on Japanese Priority Patent Application No. 2006-330926, filed on Dec. 7, 2006, the entire contents of which are hereby incorporated by reference.

What is claimed is:

1. An order support system comprising:
   a device information acquiring unit configured to search for one or more devices connected to a communication network and acquire device information from each of the devices found as a result of the search;
   a setting unit configured to obtain specified information used for extracting one or more of the devices to be candidates for monitor targets, wherein the information is specified according to a predetermined attribute included in the device information;
   an extracting unit configured to extract, based on the information obtained by the setting unit, one or more devices to be the candidates for the monitor targets from among the devices found as a result of the search;
   a monitor target selecting unit configured to display a list of the devices extracted by the extracting unit, from which list one or more of the devices are to be selected as the monitor targets;
   a communication unit configured to transmit the devices selected as the monitor targets to an order-support apparatus;
   a device monitoring apparatus configured to receive a list of the devices selected as the monitor targets from the order-support apparatus, and to acquire status information of at least one consumable element in each of the devices selected as the monitor targets received from the order-support apparatus, wherein the device monitoring apparatus comprises a status information sending unit configured to send the status information to the order-support apparatus; and
   the order-support apparatus configured to create an e-mail comprising a URL indicating a website used for ordering at least one consumable element that is detected as being deficient according to the status information received from the device monitoring apparatus, and to send the e-mail to an e-mail address registered in advance in association with the device corresponding to the deficient consumable element.

2. The order support system according to claim 1, wherein the status information sending unit determines whether the consumable element is deficient based on the status information, and sends, to the order-support apparatus, the status information relevant to the consumable element determined as being deficient.

3. The order support system according to claim 1, wherein the setting unit comprises:
   an attribute value list creating unit configured to create a list of attribute values of the predetermined attribute of the devices found as a result of the search; and
   an attribute value selecting unit configured to obtain one of the attribute values selected from the list of attribute values, which selected attribute value is to be used for extracting the devices to be the candidates of the monitor targets; and
   the extracting unit extracts, from among the devices found as a result of the search, devices having the attribute value obtained by the attribute value selecting unit as the predetermined attribute.

4. The order support system according to claim 3, wherein the attribute value list creating unit eliminates redundant attribute values in creating the list of attribute values.

5. The order support system according to claim 3, wherein the predetermined attribute is a vendor name of the devices.

6. The order support system according to claim 1, wherein the predetermined attribute is a vendor name of the devices.

7. A device monitoring method to be executed by a computer, the device monitoring method comprising:
   searching for one or more devices connected to a communication network and acquiring device information from each of the devices found as a result of the search;

obtaining specified information used for extracting one or more of the devices to be candidates for monitor targets, wherein the information is specified according to a predetermined attribute included in the device information;

extracting, by a device monitoring apparatus, based on the information obtained at the obtaining, one or more devices to be the candidates for the monitor targets from among the devices found as a result of the searching;

displaying a list of the devices extracted at the extracting, from which list one or more of the devices are to be selected as the monitor targets;

sending the devices selected as the monitor targets to an order-support apparatus;

acquiring, by the device monitoring apparatus, a list of the devices selected as the monitor targets from the order-support apparatus, and acquiring status information of at least one consumable element in each of the devices selected as the monitor targets received from the order-support apparatus;

sending the status information to the order-support apparatus; and receiving an e-mail, created by the order-support apparatus, comprising a URL indicating a website used for ordering at least one consumable element that is detected as being deficient according to the received status information, wherein the e-mail is received at an e-mail address registered in advance in association with the device corresponding to the deficient consumable element.

8. The device monitoring method according to claim 7, wherein
the sending the status information further comprises determining whether the consumable element is deficient based on the status information, and sending, to the order-support apparatus, the status information relevant to the consumable element determined as being deficient.

9. The device monitoring method according to claim 7, wherein
the obtaining further comprises:
creating a list of attribute values of the predetermined attribute of the devices found as a result of the searching; and
obtaining one of the attribute values selected from the list of attribute values, which selected attribute value is to be used for extracting the devices to be the candidates of the monitor targets; and
the extracting further comprises extracting, from among the devices found as a result of the search, devices having the attribute value obtained by the obtaining one of the attribute values as the predetermined attribute.

10. The device monitoring method according to claim 9, further comprising:
eliminating redundant attribute values in creating the list of attribute values.

11. The method according to claim 9, wherein
the predetermined attribute is a vendor name of the devices.

12. The device monitoring method according to claim 7, wherein
the predetermined attribute is a vendor name of the devices.

13. A non-transitory computer readable storage medium encoded with instructions, which when executed by a computer cause the computer to execute a method comprising:

searching for one or more devices connected to a communication network and acquiring device information from each of the devices found as a result of the search;

obtaining specified information used for extracting one or more of the devices to be candidates for monitor targets, wherein the information is specified according to a predetermined attribute included in the device information;

extracting, based on the information obtained at the obtaining, one or more devices to be the candidates for the monitor targets from among the devices found as a result of the searching;

displaying a list of the devices extracted at the extracting, from which list one or more of the devices are to be selected as the monitor targets;

sending the devices selected as the monitor targets to an order-support apparatus;

acquiring a list of the devices selected as the monitor targets from the order-support apparatus, and acquiring status information of at least one consumable element in each of the devices selected as the monitor targets received from the order-support apparatus;

sending the status information to the order-support apparatus; and receiving an e-mail, created by the order-support apparatus, comprising a URL indicating a website used for ordering at least one consumable element that is detected as being deficient according to the received status information, wherein the e-mail is received at an e-mail address registered in advance in association with the device corresponding to the deficient consumable element.

14. The device monitoring program product according to claim 13, wherein
the sending the status information further comprises determining whether the consumable element is deficient based on the status information, and sending, to the order-support apparatus, the status information relevant to the consumable element determined as being deficient.

15. The device monitoring program product according to claim 13, wherein
the obtaining further comprises:
creating a list of attribute values of the predetermined attribute of the devices found as a result of the searching; and
obtaining one of the attribute values selected from the list of attribute values, which selected attribute value is to be used for extracting the devices to be the candidates of the monitor targets; and
the extracting further comprises extracting, from among the devices found as a result of the search, devices having the attribute value obtained by the obtaining one of the attribute values as the predetermined attribute.

16. The device monitoring program product according to claim 15, further comprising:
eliminating redundant attribute values in creating the list of attribute values.

17. The non-transitory computer readable medium according to claim 15, wherein
the predetermined attribute is a vendor name of the devices.

18. The device monitoring program product according to claim 13, wherein
the predetermined attribute is a vendor name of the devices.

* * * * *